US012745108B2

(12) United States Patent
Shen et al.

(10) Patent No.: US 12,745,108 B2
(45) Date of Patent: Sep. 22, 2026

(54) MEASUREMENT METHOD, APPARATUS, AND SYSTEM

(71) Applicant: HUAWEI TECHNOLOGIES CO., LTD., Shenzhen (CN)

(72) Inventors: Zhongyi Shen, Beijing (CN); Jing Han, Beijing (CN); Li Zhang, Beijing (CN); Hong Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 278 days.

(21) Appl. No.: 18/587,812

(22) Filed: Feb. 26, 2024

(65) Prior Publication Data

US 2024/0214838 A1 Jun. 27, 2024

Related U.S. Application Data

(63) Continuation of application No. PCT/CN2022/114530, filed on Aug. 24, 2022.

(30) Foreign Application Priority Data

Sep. 2, 2021 (CN) ......................... 202111028601.X

(51) Int. Cl.

*H04W 24/00* (2009.01)
*H04W 24/02* (2009.01)
*H04W 72/0446* (2023.01)
*H04W 72/21* (2023.01)
*H04W 72/53* (2023.01)

(52) U.S. Cl.

CPC ....... *H04W 24/02* (2013.01); *H04W 72/0446* (2013.01); *H04W 72/21* (2023.01); *H04W 72/53* (2023.01)

(58) Field of Classification Search

None

See application file for complete search history.

(56) References Cited

U.S. PATENT DOCUMENTS

| | | | | |
|---|---|---|---|---|
| 2020/0107337 | A1* | 4/2020 | Lin | H04L 1/0026 |
| 2023/0063137 | A1* | 3/2023 | Matsumura | H04B 7/088 |
| 2023/0179367 | A1* | 6/2023 | Matsumura | H04L 1/1812 |
| 2024/0015615 | A1* | 1/2024 | Li | H04W 36/0085 |

FOREIGN PATENT DOCUMENTS

| | | | | |
|---|---|---|---|---|
| CN | 115606227 A | * 1/2023 | | H04W 24/08 |
| CN | 116349273 A | * 6/2023 | | H04W 24/10 |

OTHER PUBLICATIONS

3rd Generation Partnership Project; Technical Specification Group Radio Access Network; NR; Requirements for support of radio resource management (Release 17), 3GPP TS 38.133 V17.2.0 (Jun. 2021), Technical Specification, total 1828 pages.

* cited by examiner

*Primary Examiner* — Brandon M Renner

(57) ABSTRACT

Embodiments of this application provide a measurement method, an apparatus, and a system, so that when a time domain resource for layer 1 measurement and a configured time domain resource for layer 3 measurement overlap, the layer 1 measurement can be preferentially performed, thereby reducing a layer 1 measurement delay. The method includes: A terminal device obtains a first parameter associated with a first portion of a first time resource for a layer 1 measurement to a second time domain resource for a layer 3 measurement, determines first duration based on the first parameter perform the layer 1 measurement.

19 Claims, 14 Drawing Sheets

MEASUREMENT METHOD, APPARATUS, AND SYSTEM

CROSS-REFERENCE TO RELATED APPLICATIONS

This application is a continuation of International Application No. PCT/CN2022/114530, filed on Aug. 24, 2022, which claims priority to Chinese Patent Application No. 202111028601.X, filed on Sep. 2, 2021. The disclosures of the aforementioned applications are hereby incorporated by reference in their entireties.

TECHNICAL FIELD

Embodiments of this application relate to the wireless communication field, and in particular, to a measurement method, an apparatus, and a system.

BACKGROUND

In a wireless communication system, a radio access network device may configure layer 1 (layer 1, L1) measurement and layer 3 (layer 3, L3) measurement for a terminal device.

The L1 measurement may be measurement performed by the terminal device on a reference signal of a current serving cell. The terminal device may feed back, by measuring the reference signal of the current serving cell, an L1 measurement result to the radio access network device, for example, channel quality information (channel quality information, CQI), a precoding matrix indication (precoding matrix indication, PMI), layer 1 reference signal received power (L1 reference signal received power, L1-RSRP), and a layer 1 signal to interference plus noise ratio (L1 signal to interference plus noise ratio, L1-SINR). The radio access network device may schedule uplink and downlink transmission or adjust a quasi-colocation (quasi-colocation, QCL) relationship by using the L1 measurement result fed back by the terminal device. In addition, the L1 measurement may be further for radio link monitoring (radio link monitoring, RLM), beam failure detection (beam failure detection, BFD), candidate beam detection (candidate beam detection, CBD), and the like.

The L3 measurement may be measurement performed by the terminal device on a reference signal of a current serving cell and/or a neighboring cell. The radio access network device may configure a plurality of target frequencies for the terminal device. The terminal device may discover, by measuring neighboring cells on the target frequencies, a neighboring cell with a good channel condition, and report an L3 measurement result to the radio access network device. The radio access network device may control, based on the L3 measurement result, the terminal device to perform cell handover, carrier aggregation (carrier aggregation, CA) configuration, or the like.

During current implementation, the L1 measurement and the L3 measurement cannot be performed at the same time in some scenarios. Therefore, when time of the L1 measurement and time of the L3 measurement that are configured by the radio access network device conflict, how to reduce an L1 measurement delay still needs to be further studied.

SUMMARY

This application provides a measurement method, an apparatus, and a system, so that when a time domain resource for L1 measurement and a time domain resource for L3 measurement overlap, the L1 measurement can be preferentially performed, thereby reducing an L1 measurement delay.

According to a first aspect, a measurement method is provided. The method may be performed by a terminal device, may be performed by a component of the terminal device, such as a processor, a chip, or a chip system of the terminal device, or may be implemented by a logical module or software that can implement all or some functions of the terminal device. The method includes the following steps:

obtaining a first parameter, and determining first duration based on the first parameter; and performing first measurement on a reference signal of a serving cell within the first duration, to obtain at least one measurement result, where the first measurement is layer 1 measurement. The first parameter is associated with a first proportion, the first proportion is a proportion of a resource for the first measurement to a second time domain resource, the second time domain resource is a time domain resource for layer 3 measurement in an overlapping resource between a time domain resource on which the reference signal of the serving cell is located and a first time domain resource, and the first time domain resource is a configured time domain resource for the layer 3 measurement.

Based on this solution, some time domain resources for the layer 3 measurement in the overlapping resource may be for the layer 1 measurement based on the first proportion, to increase a resource that can be for the layer 1 measurement. Because the resource that can be for the layer 1 measurement increases, duration for performing the layer 1 measurement to obtain the at least one measurement result can be shortened, that is, the first duration determined based on the first parameter associated with the first proportion is shortened, thereby reducing a layer 1 measurement delay.

It may be understood that the overlapping resource in this application is an overlapping resource between the time domain resource on which the reference signal of the serving cell is located and the configured time domain resource for the layer 3 measurement. When some time domain resources for the layer 3 measurement in the overlapping resource are for the layer 1 measurement based on the first proportion, it may be considered that the layer 1 measurement is preferred compared with the layer 3 measurement.

With reference to the first aspect, in some implementations of the first aspect, the obtaining a first parameter includes: obtaining the first parameter when a first target condition is met. The first target condition includes at least one of the following:

first signaling is received from a radio access network device, where the first signaling is for activating a target secondary cell, and the target secondary cell is unknown to the terminal device;

second signaling is received from the radio access network device, where the second signaling indicates to switch to a target transmission configuration indicator (TCI) state, and the target TCI state is unknown to the terminal device;

third signaling is received from the radio access network device, where the third signaling indicates to switch to a target uplink spatial relation, and the target uplink spatial relation is unknown to the terminal device;

a beam failure occurs in the serving cell;

radio link monitoring out-of-synchronization is triggered; or a second parameter is configured, where the second parameter indicates restricted channel measurement time.

Based on this implementation, when the first target condition is met, the terminal device obtains the first parameter, and performs the first measurement, so that layer 1 measurement can be performed as soon as possible. In this way, a process corresponding to the first target condition can be completed as soon as possible. For example, the target secondary cell can be activated as soon as possible, or switching to a target receive beam can be implemented as soon as possible. This reduces a delay of a related process and improves communication efficiency.

With reference to the first aspect, in some implementations of the first aspect, the method further includes: receiving first indication information from the radio access network device, where the first indication information indicates the first proportion.

Based on this implementation, on one hand, the terminal device can learn of the first proportion, to learn of the first parameter associated with the first proportion, and perform the first measurement within the first duration, to reduce the L1 measurement delay. On the other hand, the first proportion is indicated by the radio access network device, so that the radio access network device can more flexibly control the terminal device.

With reference to the first aspect, in some implementations of the first aspect, the method further includes: receiving second indication information from the radio access network device, where the second indication information indicates that the first parameter is associated with the first proportion.

With reference to the first aspect, in some implementations of the first aspect, that the first parameter is associated with a first proportion includes: When a third target condition is met, the first parameter is associated with the first proportion, where the third target condition includes that duration in which signal quality of a primary cell (PCell) and/or a primary secondary cell (PSCell) meets a first threshold is greater than second duration, and the signal quality includes at least one of the following: reference signal received power (RSRP), reference signal received quality (RSRQ), or a signal to interference plus noise ratio (SINR).

Based on the foregoing two implementations, when the radio access network device indicates that the first parameter is associated with the first proportion, some time domain resources for the layer 3 measurement in the overlapping resource may be for the L1 measurement based on the first proportion, to increase a resource that can be for the L1 measurement, thereby reducing the L1 measurement delay.

With reference to the first aspect, in some implementations of the first aspect, the method further includes: When a first MO is associated with a trigger condition of a conditional reconfiguration event, the obtaining a first parameter includes: obtaining the first parameter when a second target condition is met. The second target condition includes:

measurement on the first MO is performed in a measurement gap corresponding to the first MO, measurement gaps in different frequency ranges are independent of each other, and a frequency of the reference signal of the serving cell and a target frequency corresponding to the first MO belong to different frequency ranges; or measurement on the first MO is gapless measurement, a frequency of the reference signal of the serving cell and a target frequency corresponding to the first MO are in different frequency bands, a carrier-specific scaling factor (CSSF) of the first MO is irrelevant to a second MO or a first component carrier CC, and frequencies of the second MO and the first CC are in a same frequency band as the frequency of the reference signal of the serving cell.

Based on this implementation, when the conditional reconfiguration event is considered, the L1 measurement delay can be reduced and impact on performance of the conditional reconfiguration event can be reduced, without affecting measurement on the MO associated with the conditional reconfiguration event.

With reference to the first aspect, in some implementations of the first aspect, when discontinuous reception (DRX) is configured for the terminal device, the performing first measurement on a reference signal of a serving cell within the first duration includes: performing, based on a period of the reference signal of the serving cell, the first measurement on the reference signal of the serving cell within the first duration.

With reference to the first aspect, in some implementations of the first aspect, the determining first duration based on the first parameter includes: determining the first duration based on the first parameter and at least one of the following: a layer 1 measurement result reporting period, the period of the reference signal of the serving cell, a beam sweeping coefficient, a quantity of sampling points, or a DRX cycle.

According to a second aspect, a measurement method is provided. The method may be performed by a radio access network device, may be performed by a component of the radio access network device, such as a processor, a chip, or a chip system of the radio access network device, or may be implemented by a logical module or software that can implement all or some functions of the radio access network device. The method includes the following steps:

obtaining second indication information, and sending the second indication information to a terminal device. The second indication information indicates that a first parameter is associated with a first proportion, the first parameter is for determining first duration, the first duration is for first measurement, the first proportion is a proportion of a resource for the first measurement to a second time domain resource, the second time domain resource is a time domain resource for layer 3 measurement in an overlapping resource between a time domain resource on which a reference signal of a serving cell is located and a first time domain resource, the first time domain resource is a configured time domain resource for the layer 3 measurement, and the first measurement is layer 1 measurement.

Based on this solution, when the first parameter is associated with the first proportion, the terminal device may preferentially perform the L1 measurement, to reduce an L1 measurement delay. Therefore, the radio access network device may flexibly control, based on an actual situation, the terminal device to preferentially perform the L1 measurement or preferentially perform L3 measurement. In a possible implementation, if the radio access network device determines that an emergency degree or a priority of the L3 measurement of the terminal device is low, for example, current mobility of the terminal device is low, the radio access network device may send the second indication information to the terminal device, to control the terminal device to preferentially perform the L1 measurement, thereby improving measurement flexibility.

With reference to the second aspect, in some implementations of the second aspect, the method further includes:

sending first indication information to the terminal device, where the first indication information indicates the first proportion.

With reference to the first aspect or the second aspect, in some implementations, that the first parameter is associated with a first proportion includes: The first parameter is equal to the first proportion, and both are 1. Based on this implementation, when the first proportion and the first parameter are 1, all overlapping resources between the time domain resource on which the reference signal of the serving cell is located and the configured resource for the layer 3 measurement are for the first measurement, so that the L1 measurement delay can be further reduced.

With reference to the first aspect or the second aspect, in some implementations, the first proportion and the first parameter meet the following formula:

$$P' = \frac{1}{1/P + (1 - 1/P) * X}.$$

P' is the first parameter, 1/P is a proportion of a time domain resource for the layer 1 measurement to the time domain resource on which the reference signal of the serving cell is located, and X is the first proportion.

With reference to the first aspect or the second aspect, in some implementations, the configured time domain resource for the layer 3 measurement includes: a synchronization signal/physical broadcast channel SSB-based measurement timing configuration (SMTC) occasion corresponding to a first measurement object (MO), and/or a time domain resource to which a measurement gap corresponding to the first MO belongs; or the configured time domain resource for the layer 3 measurement includes: a channel state information-reference signal (CSI-RS)-based measurement timing configuration occasion corresponding to a first MO, and/or a time domain resource to which a measurement gap corresponding to the first MO belongs.

With reference to the first aspect or the second aspect, in some implementations, the SMTC occasion is duration of a measurement window configured by an SMTC corresponding to the first MO, and an SSB corresponding to the first MO is transmitted in the measurement window configured by the SMTC; and the CSI-RS-based measurement timing configuration occasion is duration of a measurement window configured by a CSI-RS-based measurement timing configuration corresponding to the first MO, and a CSI-RS corresponding to the first MO is transmitted in the measurement window configured by the CSI-RS-based measurement timing configuration.

With reference to the first aspect or the second aspect, in some implementations, when the measurement result of the first measurement is RSRP, the first duration meets the following formula:

$$T_{L1} = \max(T_{report}, \text{ceil}(M * P' * N) * T_{RS}).$$

$T_{L1}$ is the first duration, $T_{report}$ is the L1 measurement result reporting period, ceil (x) represents a minimum integer greater than or equal to x, M is the quantity of sampling points, a value of M is determined depending on whether a channel measurement time restriction parameter is configured, P' is the first parameter, N is the beam sweeping coefficient, $T_{RS}$ is the period of the reference signal of the serving cell, max(x, y) represents a larger value of x and y, and * represents a mathematical multiplication sign.

With reference to the first aspect or the second aspect, in some implementations, when a DRX is configured for the terminal device, the measurement result is RSRP, and the DRX cycle is greater than or equal to a second threshold, the first duration meets the following formula:

$$T_{L1} = \max(T_{report}, \text{ceil}(A * M * P' * N) * \max(T_{DRX}, T_{RS})).$$

Alternatively, when the measurement result is RSRP, and the DRX cycle is less than a second threshold, the first duration meets the following formula:

$$T_{L1} = \text{ceil}(B * M * P' * N) * T_{DRX}.$$

$T_{L1}$ is the first duration, $T_{report}$ is the L1 measurement result reporting period, ceil(x) represents a minimum integer greater than or equal to x, M is the quantity of sampling points, a value of M is determined depending on whether a channel measurement time restriction parameter is configured, P' is the first parameter, N is the beam sweeping coefficient, $T_{RS}$ is the period of the reference signal of the serving cell, $T_{DRX}$ is the DRX cycle, and A and B are constants.

According to a third aspect, a measurement method is provided. The method may be performed by a terminal device, may be performed by a component of the terminal device, such as a processor, a chip, or a chip system of the terminal device, or may be implemented by a logical module or software that can implement all or some functions of the terminal device. The method includes: when a first target condition is met, determining that a first parameter is equal to 1; determining first duration based on the first parameter; and performing first measurement on a reference signal of a serving cell within the first duration, to obtain at least one measurement result, where the first measurement is layer 1 measurement. When the first parameter is equal to 1, an overlapping resource between a time domain resource on which the reference signal of the serving cell is located and a first time domain resource is for the first measurement, and the first time domain resource is a configured time domain resource for layer 3 measurement.

Based on this solution, when the first parameter is 1, all overlapping resources between the time domain resource on which the reference signal of the serving cell is located and the configured time domain resource for the layer 3 measurement may be for the first measurement, to increase a resource that can be for the layer 1 measurement. Because the resource that can be for the layer 1 measurement increases, the layer 1 measurement can be preferentially performed, and duration for performing the layer 1 measurement to obtain the at least one measurement result can be shortened, that is, the first duration determined based on the first parameter associated with the first proportion is shortened, thereby reducing a layer 1 measurement delay.

With reference to the third aspect, in some implementations of the third aspect, the first target condition includes at least one of the following: first signaling is received from a radio access network device, where the first signaling is for activating a target secondary cell, and the target secondary cell is unknown to the terminal device;

second signaling is received from the radio access network device, where the second signaling indicates to switch to a target TCI state, and the target TCI state is unknown to the terminal device;

third signaling is received from the radio access network device, where the third signaling indicates to switch to a target uplink spatial relation, and the target uplink spatial relation is unknown to the terminal device;

a beam failure occurs in the serving cell;

radio link monitoring out-of-synchronization is triggered; or a second parameter is configured, where the second parameter indicates restricted channel measurement time.

According to a fourth aspect, a communication apparatus is provided, to implement the foregoing method. The communication apparatus may be the terminal device in the first aspect or the third aspect, an apparatus including the terminal device, or an apparatus included in the terminal device, for example, a chip. Alternatively, the communication apparatus may be the radio access network device in the second aspect, an apparatus including the radio access network device, or an apparatus included in the radio access network device. The communication apparatus includes a corresponding module, unit, or means (means) for implementing the foregoing method. The module, unit, or means may be implemented by hardware, software, or hardware executing corresponding software. The hardware or the software includes one or more modules or units corresponding to the foregoing functions.

In some possible designs, when the communication apparatus is configured to implement a function of the terminal device, the communication apparatus may include an obtaining module and a measurement module, and may further include a transceiver module. The transceiver module may also be referred to as a transceiver unit, and is configured to implement a sending and/or receiving function in the first aspect or the third aspect and any possible implementation of the first aspect or the third aspect. The transceiver module may include a transceiver circuit, a transceiver machine, a transceiver, or a communication interface. The obtaining module may be configured to implement functions such as obtaining and determining in the first aspect or the third aspect and any possible implementation of the first aspect or the third aspect. The measurement module may be configured to implement a measurement function in the first aspect or the third aspect and any possible implementation of the first aspect or the third aspect.

When the communication apparatus is configured to implement a function of the radio access network device, the communication apparatus may include a processing module and a transceiver module. The transceiver module may also be referred to as a transceiver unit, and is configured to implement a sending and/or receiving function in the second aspect and any possible implementation of the second aspect. The transceiver module may include a transceiver circuit, a transceiver machine, a transceiver, or a communication interface. The processing module may be configured to implement a processing function in the second aspect and any possible implementation of the second aspect.

In some possible designs, the transceiver module may include a sending module and a receiving module, respectively configured to implement a sending function and a receiving function in any one of the foregoing aspects and any one of the possible implementations of the foregoing aspects.

According to a fifth aspect, a communication apparatus is provided, and includes a processor and a memory, where the memory is configured to store computer instructions. When the processor executes the instructions, the method in any one of the foregoing aspects is implemented. The communication apparatus may be the terminal device in the first aspect or the third aspect, an apparatus including the terminal device, or an apparatus included in the terminal device, for example, a chip. Alternatively, the communication apparatus may be the radio access network device in the second aspect, an apparatus including the radio access network device, or an apparatus included in the radio access network device.

According to a sixth aspect, a communication apparatus is provided, and includes a processor and a communication interface, where the communication interface is configured to communicate with a module outside the communication apparatus, and the processor is configured to execute a computer program or instructions, to perform the method according to any one of the foregoing aspects. The communication apparatus may be the terminal device in the first aspect or the third aspect, an apparatus including the terminal device, or an apparatus included in the terminal device, for example, a chip. Alternatively, the communication apparatus may be the radio access network device in the second aspect, an apparatus including the radio access network device, or an apparatus included in the radio access network device.

According to a seventh aspect, a communication apparatus is provided, and includes at least one processor, where the processor is configured to execute a computer program or instructions stored in a memory, to implement the method according to any one of the foregoing aspects. The memory may be coupled to the processor, or may be independent of the processor. The communication apparatus may be the terminal device in the first aspect or the third aspect, an apparatus including the terminal device, or an apparatus included in the terminal device, for example, a chip. Alternatively, the communication apparatus may be the radio access network device in the second aspect, an apparatus including the radio access network device, or an apparatus included in the radio access network device.

According to an eighth aspect, a communication apparatus is provided, and includes a processor and an interface circuit. The interface circuit is configured to receive a signal from another communication apparatus other than the communication apparatus and transmit the signal to the processor, or send a signal from the processor to another communication apparatus other than the communication apparatus. The processor is configured to implement the method according to any one of the foregoing aspects by using a logic circuit or executing a computer program or instructions. The communication apparatus may be the terminal device in the first aspect or the third aspect, an apparatus including the terminal device, or an apparatus included in the terminal device, for example, a chip. Alternatively, the communication apparatus may be the radio access network device in the second aspect, an apparatus including the radio access network device, or an apparatus included in the radio access network device.

According to a ninth aspect, a computer-readable storage medium is provided. The computer-readable storage medium stores a computer program or instructions. When the computer program or instructions are run on a communication apparatus, the method according to any one of the foregoing aspects is implemented.

According to a tenth aspect, a computer program product is provided. When the computer program product runs on a communication apparatus, the method according to any one of the foregoing aspects is performed.

According to an eleventh aspect, a communication apparatus (for example, the communication apparatus may be a chip or a chip system) is provided. The communication apparatus includes a processor, configured to execute a computer program or instructions to implement a function in any one of the foregoing aspects.

In some possible designs, the communication apparatus includes the memory, and the memory is configured to store necessary program instructions and data.

In some possible designs, when the apparatus is a chip system, the apparatus may include a chip, or may include a chip and another discrete component.

It may be understood that when the communication apparatus provided in any one of the fourth aspect to the eleventh aspect is a chip, the foregoing sending action/function may be understood as outputting information, and the foregoing receiving action/function may be understood as inputting information.

For a technical effect brought by any design manner in the fourth aspect to the eleventh aspect, refer to technical effects brought by different design manners in the first aspect, the second aspect, or the third aspect. Details are not described herein again.

According to a twelfth aspect, a communication system is provided. The communication system includes the terminal device according to the foregoing aspects and the radio access network device according to the foregoing aspects.

DESCRIPTION OF EMBODIMENTS

Figure 1A:
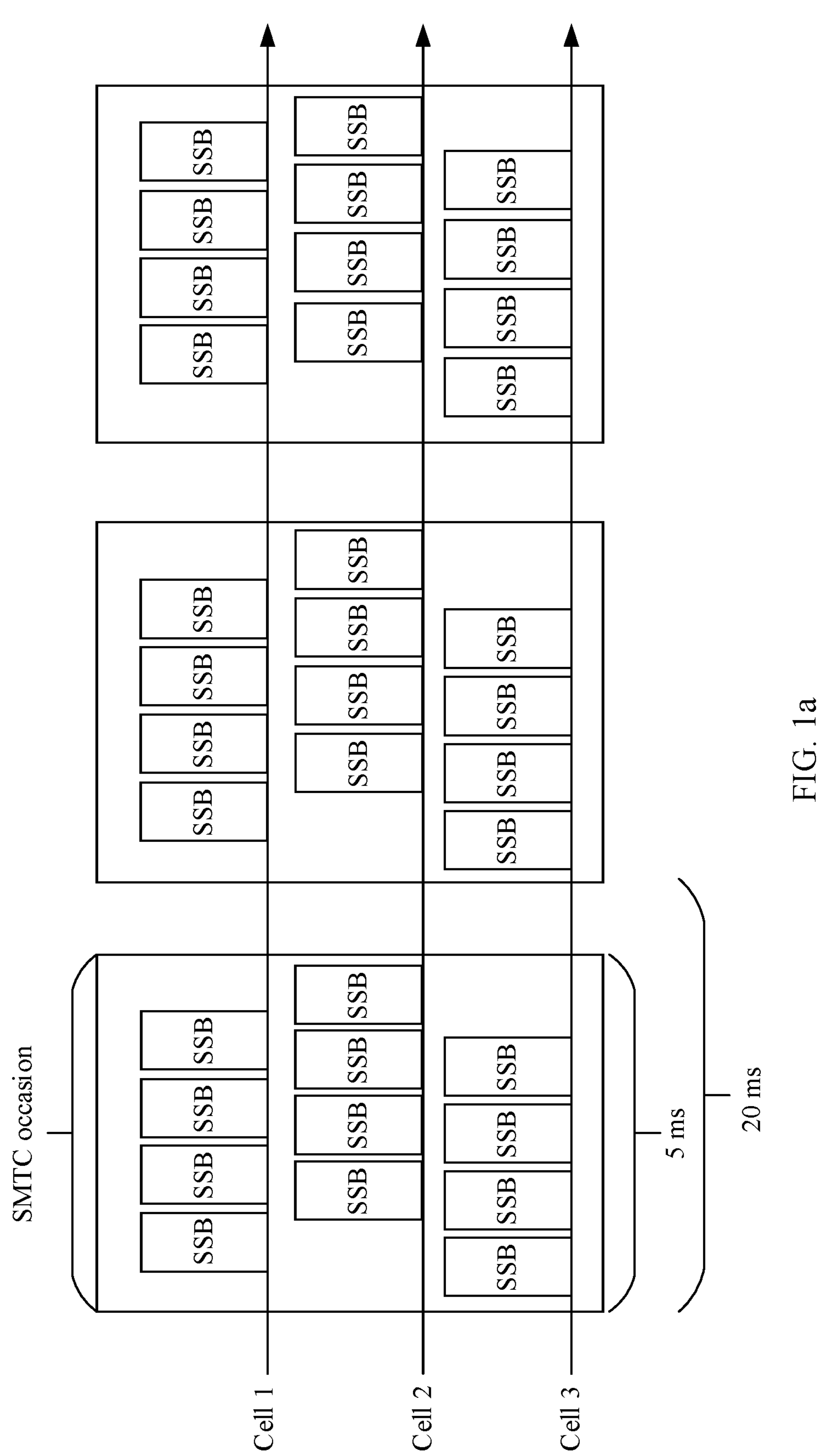
FIG. 1*a* is a schematic diagram of an SMTC occasion according to this application.

In descriptions of embodiments of this application, "and/or" is merely an association relationship for describing associated objects, and represents that three relationships may exist. For example, A and/or B may represent the following three cases: Only A exists, both A and B exist, and only B exists, where A and B may be in a singular form or a plural form.

In the descriptions of embodiments of this application, the term "a plurality of" means two or more than two unless otherwise specified. "At least one of the following items (pieces)", "one or more", or a similar expression thereof refers to any combination of these items, including any combination of singular items (pieces) or plural items (pieces). For example, at least one of a, b, or c, or at least one of a, b, and c may indicate: a, b, c, a and b, a and c, b and c, or a, b, and c, where a, b, and c may be in a singular form or a plural form.

In addition, to clearly describe the technical solutions in embodiments of this application, terms such as "first" and "second" are used in embodiments of this application to distinguish between same items or similar items that provide basically same functions or purposes. A person skilled in the art may understand that the terms such as "first" and "second" do not limit a quantity or an execution sequence, and the terms such as "first" and "second" do not indicate a definite difference. In addition, in embodiments of this application, the word such as "example" or "for example" is used to represent giving an example, an illustration, or a description. Any embodiment or design scheme described as an "example" or "for example" in embodiments of this application should not be explained as being more preferred or having more advantages than another embodiment or design scheme. Exactly, use of the terms such as "example" or "for example" are intended to present a related concept in a specific manner for ease of understanding.

It may be understood that an "embodiment" mentioned throughout this specification means that particular features, structures, or characteristics related to this embodiment are included in at least one embodiment of this application. Therefore, embodiments in the entire specification do not necessarily refer to a same embodiment. In addition, these particular features, structures, or characteristics may be combined in one or more embodiments by using any appropriate manner.

It may be understood that sequence numbers of processes do not mean execution sequences in various embodiments of this application. The execution sequences of the processes should be determined based on functions and internal logic of the processes, and should not be construed as any limitation on implementation processes of embodiments of this application.

It may be understood that, in embodiments of this application, both "when" and "if" mean that corresponding processing is performed in an objective situation, are not intended to limit time, do not require a determining action during implementation, and do not mean any other limitation.

It may be understood that, in some scenarios, some optional features in embodiments of this application may be independently implemented without depending on another feature, for example, a solution on which the optional features are currently based, to resolve a corresponding technical problem and achieve a corresponding effect. Alternatively, in some scenarios, the optional features may be combined with other features based on requirements. Correspondingly, the apparatus provided in embodiments of this application may also correspondingly implement these features or functions. Details are not described herein.

In embodiments of this application, unless otherwise specified, reference may be made to each other for same or similar parts in embodiments. In embodiments of this application and the implementations/implementation methods in embodiments, unless otherwise specified or a logical conflict occurs, terms and/or descriptions are consistent and may be mutually referenced between different embodiments and between the implementations/implementation methods in embodiments. Technical features in the embodiments the different and implementations/implementation methods in embodiments may be combined to form a new embodiment, implementation, or implementation method based on an internal logical relationship thereof. The following implementations of this application are not intended to limit the protection scope of this application.

To facilitate understanding of the technical solutions in embodiments of this application, the following briefly describes conventional technologies in this application.

1. L1 Measurement and L3 Measurement

Usually, L1 refers to a physical (physical, PHY) layer, and therefore L1 measurement may also be referred to as physical layer measurement. Optionally, the L1 measurement is filtered at L1. When a radio access network device configures a terminal device to report an L1 measurement result, the L1 measurement result may be reported by using channel state information (channel state information reference, CSI).

L3 may refer to a radio resource control (radio resource control, RRC) layer, and therefore L3 measurement may also be referred to as RRC layer measurement. Optionally, the L3 measurement is filtered at L3, and a measurement result is reported by using a measurement report (Measurementreport) message at the RRC layer. From a perspective of a type of a measured reference signal, the L3 measurement may include channel state information reference signal (channel state information reference signal, CSI-RS)-based L3 measurement and synchronization signal and physical broadcast channel block (synchronization signal and PBCH block, SSB)-based L3 measurement, where a PBCH is a physical broadcast channel (physical broadcast channel, PBCH). From a perspective of a measurement frequency, the L3 measurement may include intra-frequency measurement, inter-frequency measurement, or inter-RAT measurement.

Optionally, intra-frequency may mean that a frequency, for the L3 measurement, of a reference signal of a neighboring cell is the same as a frequency of a reference signal of a serving cell, and subcarrier spacings (subcarrier spacings, SCSs) are the same. For example, the L3 measurement is defined as SSB-based intra-frequency measurement, provided that a frequency of an SSB of a serving cell is the same as a frequency of an SSB of a neighboring cell, and subcarrier spacings of the two SSBs are the same.

It should be noted that, in this application, unless otherwise specified, the reference signal of the serving cell is a reference signal for the L1 measurement, is a measurement object of the L1 measurement, or is a reference signal that needs to be measured in the L1 measurement. For example, the reference signal of the serving cell may be an SSB or a CSI-RS.

Inter-frequency may mean that a frequency of a reference signal of a neighboring cell for the L3 measurement is different from a frequency of a reference signal of a serving cell, and/or subcarrier spacings are different. For example, the L3 measurement is defined as SSB-based inter-frequency measurement, provided that a frequency of an SSB of the serving cell is different from a frequency of an SSB of the neighboring cell, and/or subcarrier spacings of the two SSBs are different.

Inter-RAT may refer to a system that uses a different (inter) radio access technology (radio access technology, RAT) (inter-RAT) from the serving cell.

Currently, the radio access network device may configure one or more measurement objects (measurement object, MO) for the terminal device. For example, the L3 measurement is SSB-based measurement. The MO may include information about the target frequency, an SCS, and an SSB-based measurement timing configuration (SSB-based measurement timing configuration, SMTC). In a 5th generation (5th generation, 5G) new radio (new radio, NR) system, because the radio access network device sends an SSB at a fixed interval (or period), if the terminal device performs measurement at any time, a large amount of energy consumption is caused. The terminal device can search for and measure an SSB on the target frequency by using the SMTC within specified time in a fixed mode.

For example, an SMTC occasion (occasion) may be configured for the SMTC. The SMTC occasion is duration of a measurement window. An SSB of the neighboring cell on the target frequency is transmitted in the measurement window. The terminal device measures the SSB in the measurement window configured by the SMTC. The SMTC occasion may occur periodically. For example, as shown in FIG. 1*a*, for the SMTC, the SMTC occasion may be configured with a period of 20 milliseconds (ms) and duration of 5 ms. In this case, the terminal device may measure, every 20 ms, SSBs in a cell 1, a cell 2, and a cell 3 on a target frequency for duration of 5 ms.

It may be understood that the radio access network device periodically sends an SSB, that is, periodically sends an SSB burst (SSB burst). Each SSB burst includes a plurality of SSBs. In FIG. 1*a*, an example in which the SSB burst includes four SSBs is used for description.

In addition, the radio access network device may further configure a measurement gap (measurement gap) for the terminal device, and the measurement gap corresponds to a frequency range (frequency range, FR). During the measurement gap, the terminal device may measure an MO in the frequency range corresponding to the measurement gap. During the measurement gap, the terminal device may not send or receive data.

For the terminal device, when the radio access network device configures the measurement gap, the terminal device may perform the L3 measurement in the measurement gap. Alternatively, the measurement gap may not be used, that is, gapless measurement may be performed. For example, the target frequency is in an active bandwidth part (bandwidth part, BWP). Alternatively, the terminal device has a plurality of groups of radio frequency devices that can simultaneously work on different frequencies. Even if the radio access network device configures the measurement gap, the terminal device may perform the gapless measurement.

When the measurement gap and the SMTC occasion do not completely overlap, if L3 measurement corresponding to an MO is gapless measurement, the L3 measurement may be performed on an SMTC occasion that does not overlap the measurement gap; if L3 measurement corresponding to an MO depends on a measurement gap, the L3 measurement is performed on an SMTC occasion that overlaps the measurement gap.

Figure 1B:
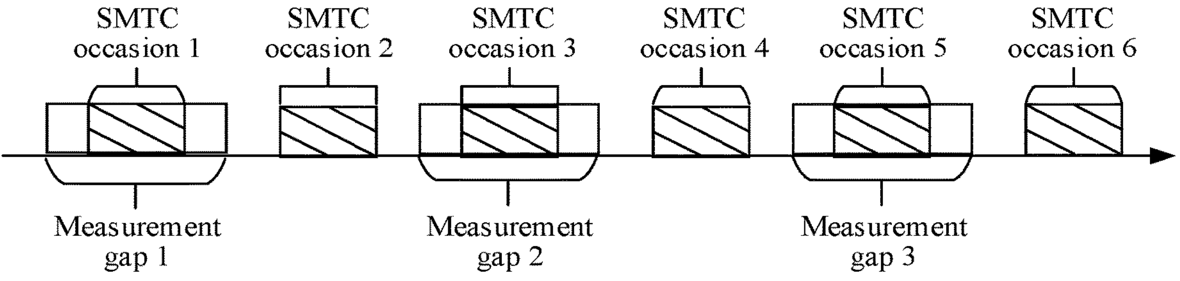
FIG. 1*b* is a schematic diagram of an overlapping relationship between an SMTC occasion and a measurement gap according to this application.

For example, a period of the SMTC occasion is 20 ms, a period of the measurement gap is 40 ms, and a status of overlapping between the SMTC occasion and the measurement gap is shown in FIG. 1*b*. If the L3 measurement is gapless measurement, the L3 measurement is performed on an SMTC occasion 2, an SMTC occasion 4, and an SMTC occasion 6. If the L3 measurement depends on the measurement gap, the L3 measurement is performed on an SMTC occasion 1, an SMTC occasion 3, and an SMTC occasion 5.

In some scenarios, the radio access network device may configure both the L1 measurement and the L3 measurement for the terminal device. Therefore, the terminal device needs to measure the reference signal of the serving cell based on an L1 measurement configuration, and measure the reference signal of the neighboring cell on the target frequency based on an L3 measurement configuration.

According to existing implementation of the terminal device, when a frequency of the serving cell is in a frequency range 2 (frequency range 2, FR2), beam sweeping needs to be performed for the L1 measurement. Similarly, when the target frequency is located in the FR2, beam sweeping also needs to be performed for the L3 measurement. However, because beams for the L1 measurement and the L3 measurement are different, and currently, the terminal device cannot simultaneously complete beam sweeping based on the different beams, the terminal device cannot simultaneously complete the L1 measurement and the L3 measurement. Therefore, when a time domain resource on which the reference signal of the serving cell is located partially or completely overlaps an SMTC occasion corresponding to the target frequency, the L1 measurement and measurement on the reference signal of the neighboring cell on the target frequency cannot be simultaneously completed on an overlapping time domain resource.

Figure 2:
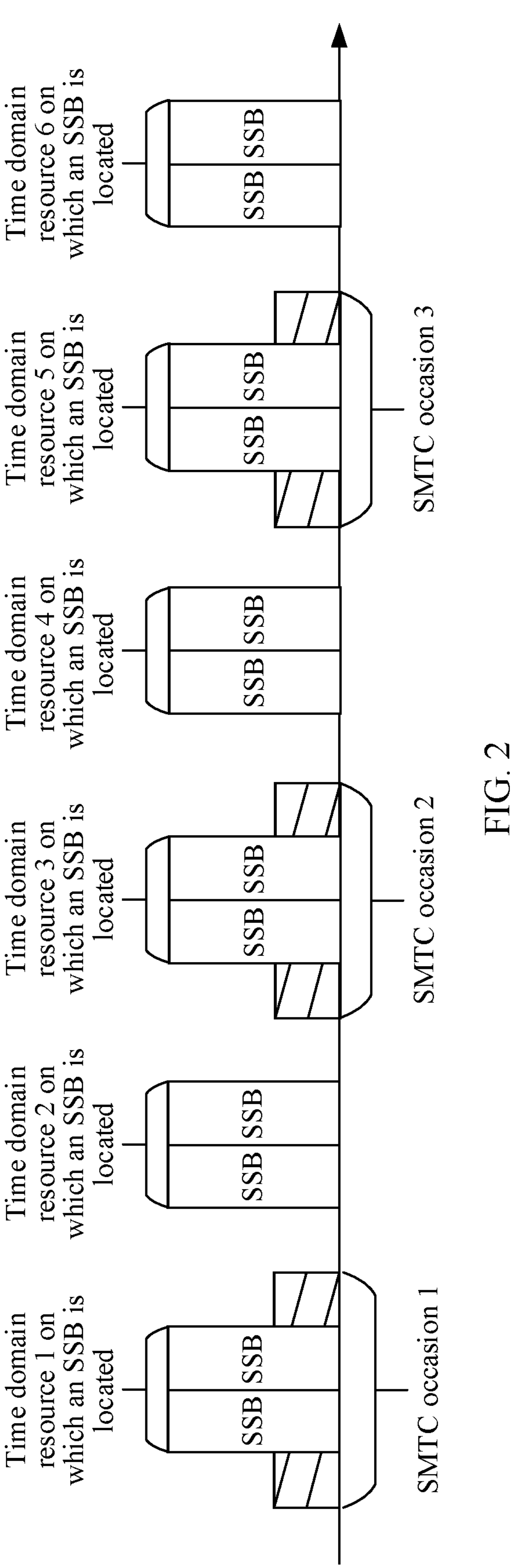
FIG. 2 is a schematic diagram showing that a time domain resource on which an SSB is located partially overlaps an SMTC occasion according to this application.

For example, assuming that the period of the SSB of the serving cell is 20 ms, the period of the SMTC occasion is 40 ms, and a status of overlapping between a time domain resource on which the SSB is located and the SMTC occasion is shown in FIG. 2, the terminal device cannot simultaneously measure the SSB of the serving cell and the SSB of the neighboring cell on the target frequency on an SMTC occasion 1, an SMTC occasion 2, and an SMTC occasion 3. It may be understood that an example in which an SSB burst includes two SSBs is used for description in FIG. 2.

For a problem that the time domain resource on which the SSB of the serving cell is located overlaps the SMTC occasion and/or the measurement gap, a parameter P is defined in the 3rd generation partnership project (3rd generation partnership project, 3GPP) technical specification (technical specification, TS) 38.133 (3GPP TS 38.133). The terminal device may determine, based on the parameter P, that a proportion of the time domain resource for the L1 measurement to the time domain resource on which the SSB of the serving cell is located is 1/P. P is calculated as follows:

$$P = \frac{1}{1 - \frac{T_{SSB}}{T_{SMTCperiod}}}$$

when the time domain resource on which the SSB is located does not overlap the measurement gap and the SSB and the SMTC occasion partially overlap ($T_{SSB}<T_{SMTCperiod}$). $T_{SSB}$ is the period of the SSB, and $T_{SMTCperiod}$ is the period of the SMTC occasion.

$P=P_{sharing\ factor}$ when the time domain resource on which the SSB is located does not overlap the measurement gap and the SSB and the SMTC occasion completely overlap ($T_{SSB}=T_{SMTCperiod}$). Usually, $P_{sharing\ factor}$ is 3.

$$P = \frac{1}{1 - \frac{T_{SSB}}{MGRP} - \frac{T_{SSB}}{T_{SMTCperiod}}}$$

when the time domain resource on which the SSB is located partially overlaps the measurement gap, the SSB partially overlaps the SMTC occasion ($T_{SSB}<T_{SMTCperiod}$), the SMTC occasion does not overlap the measurement gap, and $T_{SMTCperiod} \neq MGRP$ or $T_{SMTCperiod}=MGRP$ and $T_{SSB}<0.5*T_{SMTCperiod}$. MGRP is a measurement gap repeat period (measurement gap repeat period, MGRP).

$$P = \frac{P_{sharing\ factor}}{1 - \frac{T_{SSB}}{MGRP}}$$

when the time domain resource on which the SSB is located partially overlaps the measurement gap, the SSB completely overlaps the SMTC occasion ($T_{SSB}<T_{SMTCperiod}$), the SMTC occasion does not overlap the measurement gap, and $T_{SMTCperiod}=MGRP$ and $T_{SSB}=0.5*T_{SMTCperiod}$.

$$P = \frac{1}{1 - \frac{T_{SSB}}{\min(T_{SMTCperiod}, MGRP)}}$$

when the time domain resource on which the SSB is located partially overlaps the measurement gap ($T_{SSB}<MGRP$), the SSB partially overlaps the SMTC occasion ($T_{SSB}<T_{SMTCperiod}$), and the SMTC occasion partially or completely overlaps the measurement gap.

$$P = \frac{P_{sharing\ factor}}{1 - \frac{T_{SSB}}{MGRP}}$$

when the time domain resource on which the SSB is located partially overlaps the measurement gap, the SSB completely overlaps the SMTC occasion ($T_{SSB}=T_{SMTCperiod}$), and the SMTC occasion partially overlaps the measurement gap ($T_{SMTCperiod}<MGRP$).

For example, based on the example shown in FIG. 2, the measurement gap is not considered, and the SSB and the SMTC occasion partially overlap. In this case, $$P = \frac{1}{1 - \frac{T_{SSB}}{T_{SMTCperiod}}} = \frac{1}{1 - \frac{20}{40}} = 2,$$

and 1/P=½. To be specific, the proportion of the time domain resource for the L1 measurement to the time domain resource on which the SSB of the serving cell is located is ½.

In other words, half of the time domain resource on which the SSB of the serving cell is located is for the L3 measurement. Because the L3 measurement is performed on the SMTC occasion, the SMTC occasion 1, the SMTC occasion 2, and the SMTC occasion 3 shown in FIG. 2 are for the L3 measurement. That is, when the time domain resource on which the SSB of the serving cell is located partially overlaps the SMTC occasion, all overlapping time domain resources are for the L3 measurement. In this case, it may be considered that the L3 measurement is preferred.

Figure 3:
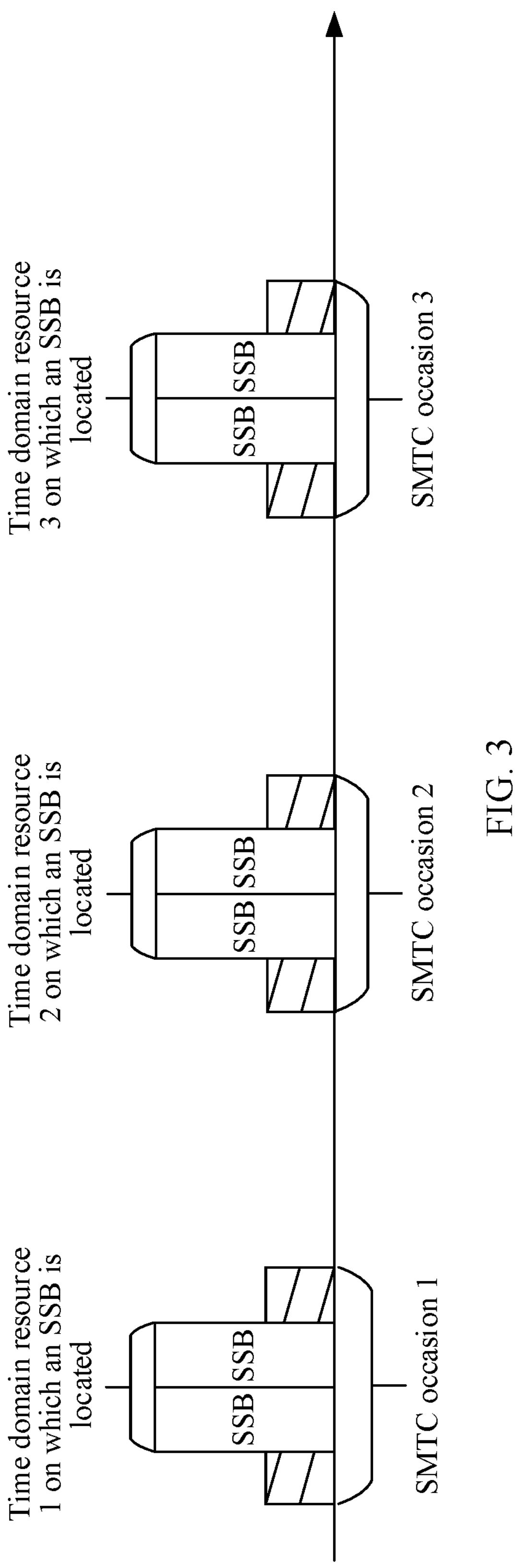
FIG. 3 is a schematic diagram showing that a time domain resource on which an SSB is located completely overlaps an SMTC occasion according to this application.

Alternatively, it is assumed that the period of the SSB of the serving cell is 40 ms, the period of the SMTC occasion is also 40 ms, and a status of overlapping between the time domain resource on which the SSB is located and the SMTC occasion is shown in FIG. 3. In this case, $P=P_{sharing\ factor}=3$, and 1/P=⅓. To be specific, the proportion of time domain resource for the L1 measurement to the time domain resource on which the SSB of the serving cell is located is ⅓.

In other words, ⅔ of the time domain resource on which the SSB of the serving cell is located is for the L3 measurement. For example, an SMTC occasion 2 and an SMTC occasion 3 shown in FIG. 3 are for the L3 measurement, and a time domain resource 1 on which the SSB is located is for the L1 measurement.

In the foregoing scenario, because a part of the time domain resource on which the SSB of the serving cell is located is for the L3 measurement, to achieve same L1 measurement performance (for example, achieve same measurement result precision), an L1 measurement period is prolonged. For example, when the L1 measurement is L1-RSRP measurement in the FR2, a definition of the L1 measurement period $T_{L1\text{-}RSRP\_Measurement\_Period\_SSB}$ in the foregoing scenario in the protocol is shown in Table 1.

In a possible implementation, in this embodiment of this application, the terminal device obtains at least one L1 measurement result in one L1 measurement period. In a process of obtaining one L1 measurement result, the terminal device may measure a reference signal in one or more reference signal periods. In other words, the terminal device may measure the reference signal in the one or more reference signal periods, to obtain one L1 measurement result. In other words, one measurement result is obtained in the one or more reference signal periods, and the L1 measurement period may include a plurality of reference signal periods.

Figure 4A:
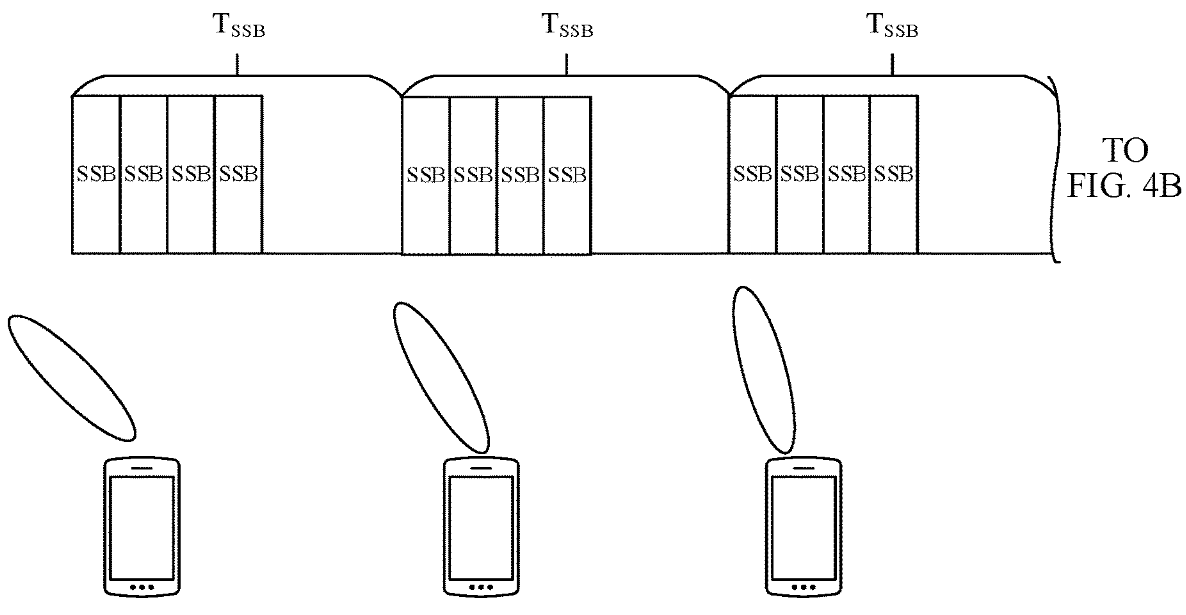
FIG. 4A to FIG. 4C are a schematic diagram of a beam direction during measurement according to this application.
Figure 4B:
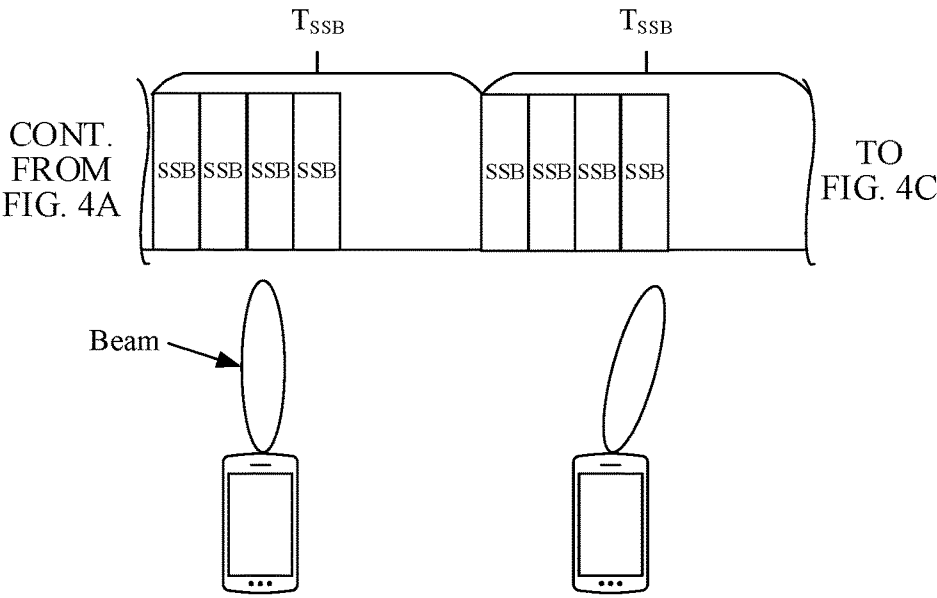
Figure 4C:
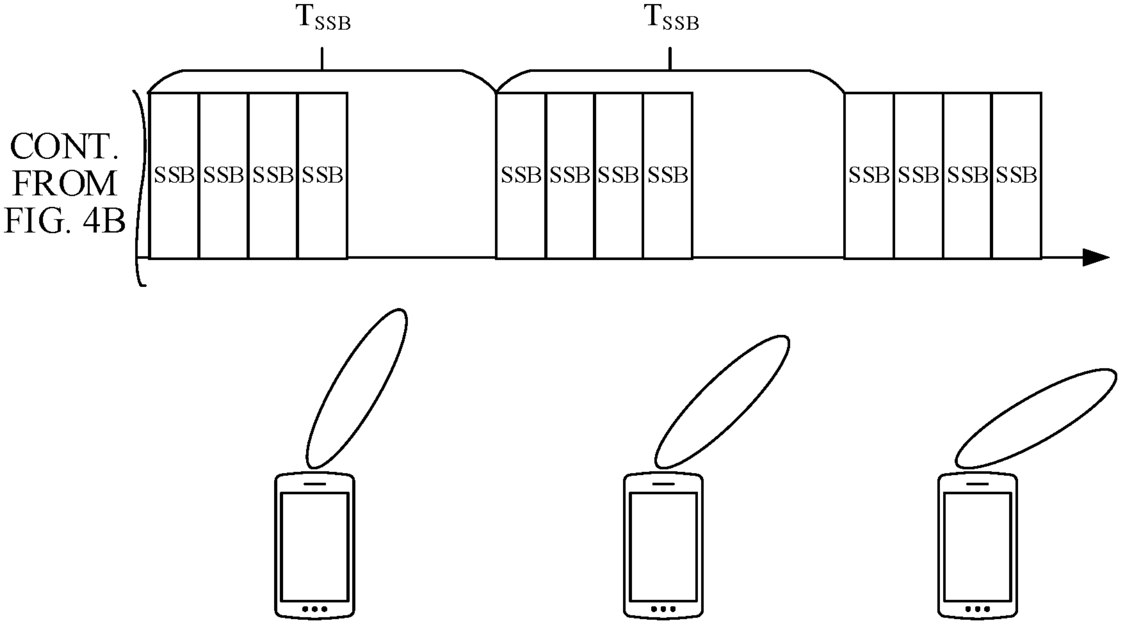

For example, for the L1 measurement in the FR2, the terminal device may measure a reference signal of a serving cell in M*N1 periods, to obtain one L1 measurement result, where N1 is a positive integer less than or equal to N. For example, as shown in FIG. 4A to FIG. 4C, an SSB burst includes four SSBs, M is equal to 1, N is equal to 8, and N1 is equal to N. In this case, the terminal device needs to measure SSBs of a serving cell in eight $T_{SSB}$ in eight directions, to obtain one L1 measurement result.

2. Carrier Aggregation (Carrier Aggregation, CA) and Dual Connectivity (Dual Connectivity, DC)

CA means that two or more component carriers (component carrier, CC) are aggregated to support larger transmission bandwidth. Basic concepts mentioned in CA are as follows:

A primary cell (primary cell, PCell) is a cell in which a terminal device performs initial connection establishment, a cell in which the terminal device performs RRC connection reestablishment, or a primary cell specified in a handover process.

A secondary cell (secondary cell, SCell) is a cell added in an RRC message, and provides additional radio resources.

A serving cell (serving cell) is a cell that provides a service for a terminal device. The serving cell may be a PCell, or may be an SCell.

TABLE 1

| Configuration | $T_{L1\text{-}RSRP\_Measurement\_Period\_SSB}$ (ms) |
|---|---|
| Discontinuous reception (discontinuous reception, DRX) not configured | $\max(T_{report}, \text{ceil}(M * P * N) * T_{SSB})$ |
| DRX cycle ≤ 320 ms | $\max(T_{report}, \text{ceil}(1.5 * M * P * N) * \max(T_{DRX}, T_{SSB}))$ |
| DRX cycle > 320 ms | $\text{ceil}(1.5 * M * P * N) * T_{DRX}$ |

$T_{report}$ is a reporting period of an L1-RSRP measurement result configured by the radio access network device. If no measurement result needs to be reported, a value of $T_{report}$ may be 0. N is a beam sweeping coefficient. $T_{DRX}$ is a DRX cycle.

A value of M is determined depending on whether the radio access network device configures a channel measurement time restriction (timeRestrictionForChannelMeasurement) parameter. If the channel measurement time restriction parameter is configured (for example, time RestrictionForChannelMeasurement in a CSI report configuration (CSI-ReportConfig) is set to "Configured"), it indicates that a network expects the terminal device to complete the L1 measurement as soon as possible. In this case, a value of M is 1. If the channel measurement time restriction parameter is not configured (for example, timeRestrictionForChannelMeasurement in the CSI report configuration (CSI-ReportConfig) is set to "notConfigured"), a value of M is 3.

Optionally, the radio access network device may configure L1 measurement (which may be periodic, aperiodic, or semi-static) for the SCell. If the SCell is unknown to the terminal device, after receiving an SCell activation command, the terminal device first synchronizes with the SCell, and then performs L1 measurement on the SCell based on a configuration of the radio access network device. Before the terminal device receives a TCI state, an uplink spatial relation (spatial relation), and the like that correspond to the SCell and that are configured by the radio access network device, the terminal device needs to quickly complete the L1 measurement on the SCell and report a measurement result, so that the radio access network device configures the TCI state, the uplink spatial relation, and the like for the terminal device as soon as possible based on the measurement result, so that the terminal device performs data receiving and sending in the SCell, to improve communication efficiency and a network throughput.

Optionally, when the SCell falls within a frequency range 1 (frequency range 1, FR1), the SCell is known to the terminal device when the following two cases are met; otherwise, the SCell is unknown to the terminal device.

Case (a): The terminal device reports a valid measurement result of the SCell within a period of time before receiving the SCell activation command.

Case (b): In an SCell activation process and within a period of time before the activation process, the reference signal of the SCell always keeps a detectable condition, where the detectable condition may include at least one of the following: a signal to interference plus noise ratio (signal to interference plus noise ratio, SINR) of the reference signal of the SCell is greater than or equal to a first preset value, an interference power spectral density of the reference signal of the SCell is greater than or equal to a second preset value, or reference signal received power of the SCell is greater than or equal to a third preset value.

Optionally, when the SCell falls within a frequency range 2 (frequency range 2, FR2), the SCell is known to the terminal device when the following three conditions are met; otherwise, the SCell is unknown to the terminal device.

Case (a): The terminal device reports a valid layer 3 reference signal received power (layer 3 reference signal received power, L3-RSRP) measurement report within a period of time before the terminal device receives a latest transmission configuration indicator (transmission configuration indicator, TCI) activation command and a latest semi-static CSI-RS activation command.

Case (b): The terminal device receives SCell activation signaling after L3-RSRP is reported, and a time point at which the terminal device receives the SCell activation signaling is not later than a time point at which the terminal device receives a medium access control control element (medium access control control element, MAC CE) that is for TCI activation.

Case (c): A reference signal for which the terminal device has reported a measurement report is always detectable in a period from reporting of L3-RSRP to reporting of a valid channel quality indicator (channel quality indicator, CQI). For a detectable condition, refer to the foregoing descriptions. Details are not described again. In addition, the TCI is configured based on one or more reference signals recently reported by the terminal device.

Optionally, a frequency range of an FR1 may be 410 MHz to 7125 MHZ, and a frequency range of an FR2 may be 24250 MHz to 52600 MHZ. Alternatively, the frequency range of the FR2 may be further extended to a higher frequency. For example, the frequency range of the FR2 may be 24250 MHz to 71 GHz.

Optionally, it may also be considered that the SCell is unknown to the terminal device in the following cases: A network side does not configure the SCell for the terminal device, the terminal device does not receive related information of the SCell, or the terminal device cannot identify the SCell.

DC means that a terminal device is simultaneously connected to two radio access network devices of a same RAT or different RATs. Basic concepts mentioned in DC are as follows: A master cell group (master cell group, MCG) is a cell on a primary network, and includes a PCell and an SCell.

A secondary cell group (secondary cell group, SCG) is a cell on a secondary network, and includes a primary secondary cell (primary secondary cell, PSCell) and an SCell.

A serving cell (serving cell) is a cell that provides a service for a terminal device. The serving cell may be a cell in the MCG, or may be a cell in the SCG.

3. Transmission Configuration Indicator (Transmission Configuration Indicator, TCI) and Uplink Spatial Relation The TCI may indicate a QCL relationship of a physical downlink control channel (physical downlink control channel, PDCCH) or a physical downlink shared channel (physical downlink shared channel, PDSCH). The QCL relationship indicates that a plurality of reference signals (or antenna ports or reference signal resources) have one or more same or similar communication features. A same or similar communication configuration may be used for a plurality of reference signals (or antenna ports or reference signal resources) that have a QCL relationship.

For example, a radio access network device may indicate, by using a TCI state (TCI-state), a reference signal that meets a QCL relationship with a DMRS (demodulation reference signal, DMRS) of a PDCCH or a PDSCH.

Uplink spatial relation: The uplink spatial relation indicates an uplink transmit beam and/or a power control parameter of the uplink transmit beam.

Optionally, when a TCI state configured by the radio access network device is unknown to a terminal device, the terminal device needs to preferentially perform L1 measurement, to determine a target receive beam indicated by the TCI state as soon as possible, thereby quickly switching to the target receive beam for downlink receiving.

Similarly, when an uplink spatial relation configured by the radio access network device is unknown to the terminal device, the terminal device also needs to preferentially perform L1 measurement, to determine a target transmit beam indicated by the uplink spatial relation as soon as possible, thereby quickly switching to the target transmit beam for uplink sending.

Optionally, the TCI state is known to the terminal device when the following six cases are met; otherwise, the TCI state is unknown to the terminal device.

Case (a): A TCI state switching command is received within 1280 milliseconds (ms) after a last transmission of a reference signal resource, where the reference signal resource is for beam reporting (beam reporting) or measurement.

Case (b): Before a TCI state switching command is received, the terminal device has sent at least one L1-RSRP report for a target TCI state.

Case (c): A TCI state remains detectable during TCI state switching.

Case (d): An SSB associated with a TCI state remains detectable during TCI state switching.

Case (e): A signal-to-noise ratio (signal-to-noise ratio, SNR) in a TCI state is greater than or equal to −3 dB.

Case (f): In a period from a last transmission of a reference signal resource to completion of activation of TCI state switching, a reference signal for L1-RSRP measurement is a reference signal in a target TCI state or a reference signal that meets a QCL relationship with the target TCI state, where the reference signal resource is for an L1-RSRP measurement report in the target TCI state.

Optionally, the uplink spatial relation is known to the terminal device when the following seven cases are met; otherwise, the uplink spatial relation is unknown to the terminal device.

Case (a): A spatial relation switching command is received within 1280 milliseconds (ms) after a last transmission of a downlink reference signal resource, where the reference signal resource is for beam reporting or measurement.

Case (b): Before a spatial relation switching command is received, the terminal device has sent at least one L1-RSRP report for a target spatial relation.

Case (c): During spatial relation switching, a downlink reference signal configured based on the spatial relation remains detectable.

Case (d): An SNR of a downlink reference signal configured in the spatial relation is greater than or equal to −3 dB.

Case (e): During spatial relation switching, a reference signal associated with the spatial relation remains detectable.

Case (f): An SNR of a reference signal related to the spatial relation is greater than or equal to −3 dB.

Case (g): In a period from a last transmission of a downlink reference signal resource to completion of activation of the spatial relation, a downlink reference signal resource for L1-RSRP measurement is a downlink reference signal in a target spatial relation or a downlink reference signal that meets a QCL type D (QCL type D) with the target spatial relation, where the downlink reference signal resource is for L1-RSRP measurement reporting in the target spatial relation.

Optionally, it may also be considered that the TCI state is unknown to the terminal device in the following cases: A network side does not configure the TCI state for the terminal device, the terminal device does not receive related information of the TCI state, or the terminal device cannot identify the TCI state.

Optionally, it may also be considered that the uplink spatial relation is unknown to the terminal device in the following cases: A network side does not configure the uplink spatial relation for the terminal device, the terminal device does not receive related information of the uplink spatial relation, or the terminal device cannot identify the uplink spatial relation.

4. Beam Failure

A radio access network device may configure, for a terminal device, a beam failure detection resource group that is for beam failure detection and a candidate beam resource group that is for determining a candidate beam. When detecting that quality of a resource in the beam failure detection resource group is lower than a threshold, the terminal device determines that a beam failure occurs. After the beam failure occurs, the terminal device needs to preferentially perform candidate beam detection (candidate beam detection, CBD) measurement on the resource in the candidate beam resource group, to select, from the candidate beam resource group based on a measurement result, a beam corresponding to a resource with good quality, to perform beam failure recovery.

5. RLM

A terminal device may perform periodic L1 measurement based on an L1 measurement period, to evaluate link quality of a serving cell. When the terminal device finds that the link quality is poor, RLM out-of-sync (that is, RLM out-of-sync) is triggered. In this case, the terminal device needs to preferentially perform RLM synchronization (in-sync) (that is, RLM in-sync) measurement, and determine, based on a result of the RLM in-sync measurement, whether the link quality is recovered. If the link quality is not recovered, the terminal device may perform an operation such as connection re-establishment.

As described above, the terminal device may need to preferentially perform L1 measurement when the unknown SCell is activated, the unknown TCI state or the unknown uplink spatial relation is switched to, the RLM out-of-sync is triggered, or the channel measurement time restriction parameter is configured. However, in a current standard, when a time domain resource on which a reference signal of a serving cell is located overlaps a time domain resource for L3 measurement, the L3 measurement is preferred. Therefore, according to a target standard, L1 measurement may not be preferentially performed in the foregoing scenario, increasing a delay of the L1 measurement.

Based on this, this application provides a measurement method. In a scenario in which L1 measurement needs to be quickly completed, when a time domain resource for the L1 measurement overlaps a time domain resource for L3 measurement, the L1 measurement can be preferentially performed, thereby reducing an L1 measurement delay.

The technical solutions in embodiments of this application may be applied to various communication systems. The communication system may be a 3GPP communication system, for example, a 5G mobile communication system, a vehicle to everything (vehicle to everything, V2X) system, an LTE and 5G hybrid networking system, a device-to-device (device-to-device, D2D) system, a machine-to-machine (machine-to-machine, M2M) system, an internet of things (Internet of Things, IOT), a wireless fidelity (wireless fidelity, Wi-Fi), a worldwide interoperability for microwave access (Worldwide Interoperability for Microwave Access, WiMAX) system, and another next-generation communication system. Alternatively, the communication system may be a non-3GPP communication system. This is not limited.

The technical solutions in embodiments of this application may be applied to various communication scenarios, for example, may be applied to one or more of the following communication scenarios: enhanced mobile broadband (enhanced mobile broadband, eMBB), ultra-reliable and low latency communication (ultra-reliable and low latency communication, URLLC), machine-type communication (machine-type communication, MTC), massive machine-type communication (massive machine-type communication, mMTC), D2D, V2X, and IoT.

The communication system and the communication scenarios applicable to this application are merely examples for description. The communication system and the communication scenarios applicable to this application are not limited thereto. This is uniformly described herein. Details are not described below again.

Figure 5:
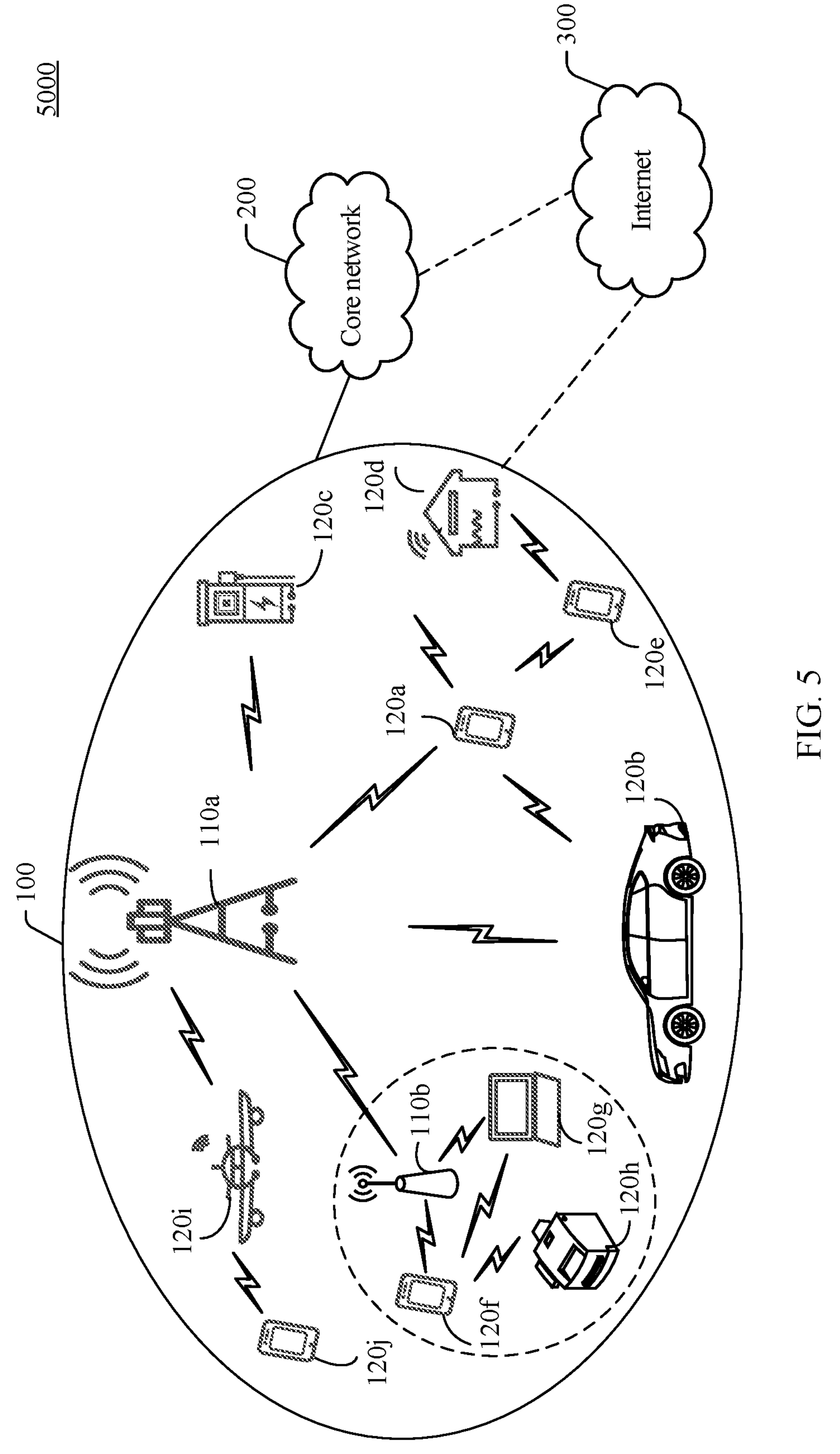
FIG. 5 is a schematic diagram of an architecture of a mobile communication system applied to an embodiment of this application.

FIG. 5 is a schematic diagram of an architecture of a communication system 5000 applied to an embodiment of this application. As shown in FIG. 5, the communication system includes a radio access network 100. Optionally, the communication system 5000 may further include a core network 200 and an Internet 300. The radio access network 100 may include at least one radio access network device (for example, 110*a* and 110*b* in FIG. 5), and may further include at least one terminal device (for example, 120*a* to 120*j* in FIG. 5). The terminal device is connected to the radio access network device in a wireless manner, and the radio access network device is connected to the core network in a wireless or wired manner. A core network device and the radio access network device may be independent and different physical devices, or functions of the core network device and logical functions of the radio access network device are integrated into a same physical device, or some functions of the core network device and some functions of the radio access network device are integrated into one physical device. Terminal devices may be connected to each other in a wired or wireless manner, so are radio access network devices. FIG. 5 is merely a schematic diagram. The communication system may further include another network device, for example, a wireless relay device and a wireless backhaul device, which are not shown in FIG. 5.

The radio access network device may be a base station (base station), an evolved NodeB (evolved NodeB, eNodeB), a transmission reception point (transmission reception point, TRP), a next-generation base station (next generation NodeB, gNB) in a 5G mobile communication system, a next-generation base station in a 6th generation (6th generation, 6G) mobile communication system, a base station in a future mobile communication system, an access node in a Wi-Fi system, or the like; or may be a module or a unit that completes some functions of a base station, for example, may be a central unit (central unit, CU) or a distributed unit (distributed unit, DU).

Optionally, the CU may complete functions of a radio resource control protocol layer and a packet data convergence protocol (packet data convergence protocol, PDCP) layer of the base station, and may further complete functions of a service data adaptation protocol (service data adaptation protocol, SDAP) layer. The DU may complete functions of a radio link control layer and a medium access control (medium access control, MAC) layer of the base station, and may further complete some or all functions of a physical layer. For specific descriptions of the foregoing protocol layers, refer to related technical specifications in 3GPP.

The radio access network device may be a macro base station (like 110*a* in FIG. 5), may be a micro base station or an indoor base station (like 110*b* in FIG. 5), or may be a relay node or a donor node. A specific technology and a specific device form that are used by the radio access network device are not limited in embodiments of this application.

The terminal device may also be referred to as a terminal, user equipment (user equipment, UE), a mobile station, a mobile terminal, or the like. The terminal may be widely used in various scenarios, for example, D2D, V2X communication, MTC, IoT, virtual reality, augmented reality, industrial control, self-driving, telemedicine, a smart grid, smart furniture, a smart office, a smart wearable, smart transportation, and a smart city. The terminal may be a mobile phone, a tablet computer, a computer with a wireless transceiver function, a wearable device, a vehicle, a vehicle-mounted device, an uncrewed aerial vehicle, a helicopter, an airplane, a ship, a robot, a robot arm, a smart home device, or the like. A specific technology and a specific device form that are used by the terminal device are not limited in embodiments of this application.

The radio access network device and the terminal device may be at fixed locations, or may be movable. The radio access network device and the terminal device may be deployed on land, including an indoor or outdoor device, or a handheld or vehicle-mounted device; may be deployed on water; or may be deployed on an airplane, a balloon, and an artificial satellite in the air. Application scenarios of the radio access network device and the terminal device are not limited in embodiments of this application.

Roles of the radio access network device and the terminal may be relative. For example, a helicopter or an uncrewed aerial vehicle 120*i* in FIG. 5 may be configured as a mobile base station. For a terminal 120*j* that accesses the radio access network 100 by using 120*i*, the terminal 120*i* is a radio access network device. However, for a radio access network device 110*a*, 120*i* is a terminal. In other words, 110*a* and 120*i* communicate with each other through a radio air interface protocol. Certainly, 110*a* and 120*i* may alternatively communicate with each other through an interface protocol between radio access network devices. In this case, 120*i* is also a radio access network device relative to 110*a*. Therefore, both the radio access network device and the terminal may be collectively referred to as a communication apparatus. 110*a* and 110*b* in FIG. 5 may be referred to as a communication apparatus having a function of the radio access network device, and 120*a* to 120*j* in FIG. 5 may be referred to as a communication apparatus having a function of the terminal.

In embodiments of this application, the function of the radio access network device may be performed by a module (for example, a chip) in the radio access network device, or may be performed by a control subsystem including the function of the radio access network device. The control subsystem including the function of the radio access network device herein may be a control center in the foregoing application scenarios such as the smart grid, the industrial control, the smart transportation, and the smart city. The function of the terminal may be performed by a module (for example, a chip or a modem) in the terminal, or may be performed by an apparatus including the function of the terminal.

Figure 6:
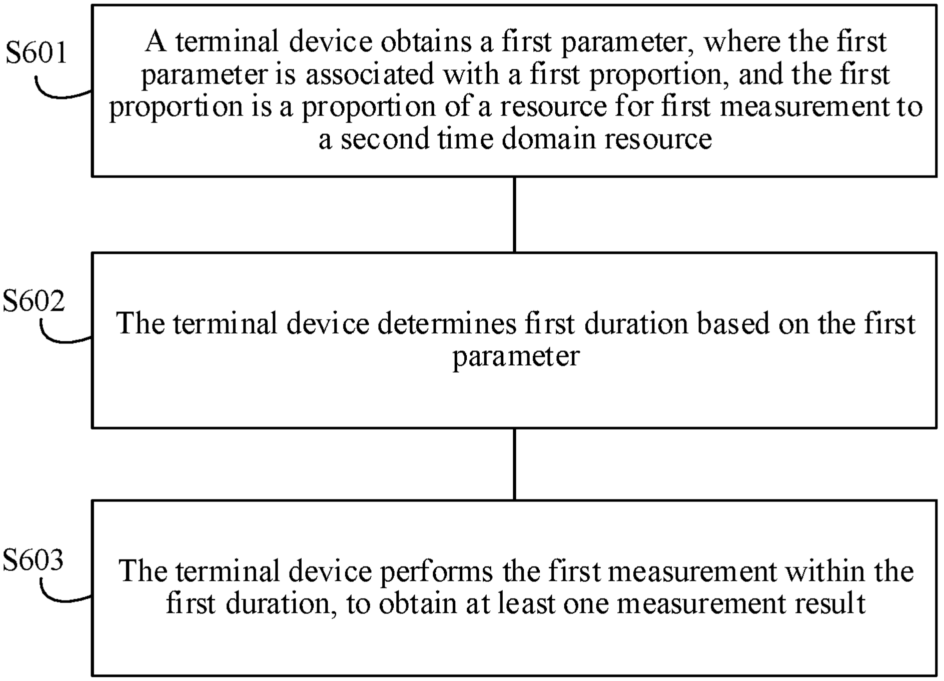
FIG. 6 is a schematic flowchart of a measurement method according to this application.

The following describes in detail the measurement method provided in this application. FIG. 6 shows a measurement method according to this application. The measurement method includes the following steps.

S601. A terminal device obtains a first parameter.

The first parameter is associated with a first proportion. The first proportion is a proportion of a resource for first measurement to a second time domain resource. The second time domain resource is a time domain resource for layer 3 measurement in an overlapping resource between a time domain resource on which a reference signal of a serving cell is located and a first time domain resource. The first time domain resource is a configured time domain resource for the layer 3 measurement.

It should be noted that the resource for the first measurement in this application is a time domain resource for the first measurement. This is uniformly described herein, and details are not described in the following embodiments.

The first measurement is layer 1 measurement. For example, the first measurement is layer 1 measurement that needs to be quickly completed, or the first measurement is layer 1 measurement for which a measurement result needs to be obtained as soon as possible.

Optionally, the first time domain resource, that is, the configured time domain resource for the layer 3 measurement, may include: an SMTC occasion corresponding to a first MO, and/or a time domain resource to which a measurement gap corresponding to the first MO belongs. The first MO is one or more MOs configured by a radio access network device. The SMTC occasion corresponding to a first MO may be understood as duration of a measurement window configured by an SMTC of the first MO, and an SSB corresponding to the first MO is transmitted in the measurement window configured by the SMTC. The SSB corresponding to the first MO may be an SSB of a neighboring cell on a target frequency of the first MO. The measurement gap corresponding to the first MO may be a measurement gap corresponding to an FR to which the first MO belongs.

Alternatively, the first time domain resource, that is, the configured time domain resource for the layer 3 measurement, may include: some orthogonal frequency division multiplexing (orthogonal frequency division multiplexing, OFDM) symbols in an SMTC occasion corresponding to a first MO, and/or a time domain resource to which a measurement gap corresponding to the first MO belongs. The some OFDM symbols include a first OFDM symbol, a last OFDM symbol before the first OFDM symbol, and a first OFDM symbol after the first OFDM symbol. The first OFDM symbol is a symbol on which a reference signal for the L3 measurement is located. A location of the first symbol may be indicated by the radio access network device to the terminal device by using an SSB-ToMeasure (SSB-ToMeasure) information element and a reference signal-received signal strength indicator measurement (SS-RSSI-Measurement) information element.

Alternatively, the first time domain resource, that is, the configured time domain resource for the layer 3 measurement, may include: a CSI-RS-based measurement timing configuration occasion corresponding to a first MO, and/or a time domain resource to which a measurement gap corresponding to the first MO belongs. A CSI-RS-based measurement timing configuration may be described as a CSI-RS-based measurement timing configuration in a protocol, and is referred to as a CMTC for short. For ease of description, the following uses an example in which the CMTC represents the CSI-RS-based measurement timing configuration for description. The CMTC is similar to the SMTC, and a difference lies in that the CMTC is for L3 measurement of a CSI-RS. For related implementation, refer to related descriptions of the SMTC. Details are not described herein again.

Optionally, the CMTC occasion may be duration of a measurement window configured by a CMTC of the first MO, and a CSI-RS corresponding to the first MO is transmitted in the measurement window configured by the CMTC. The CSI-RS corresponding to the first MO may be a CSI-RS of the neighboring cell on the target frequency of the first MO.

Figure 7:
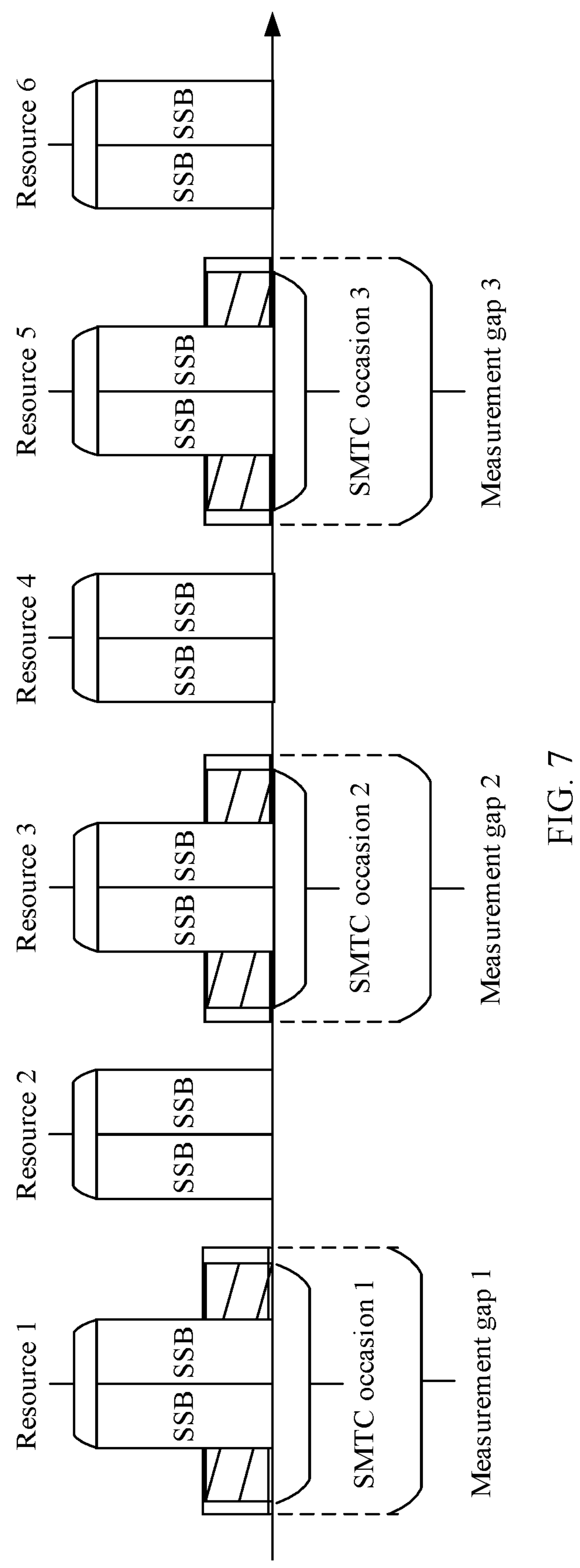
FIG. 7 is a schematic diagram showing that a time domain resource on which an SSB is located partially overlaps an SMTC occasion and a measurement gap according to this application.

For example, the configured time domain resource for the layer 3 measurement includes the SMTC occasion corresponding to a first MO and the time domain resource to which the measurement gap corresponding to the first MO belongs. It is assumed that a period of the SMTC occasion corresponding to a first MO is 40 ms, a repetition period of the measurement gap corresponding to the first MO is also 40 ms, duration of the measurement gap corresponding to the first MO is greater than the SMTC occasion corresponding to a first MO, and a period of an SSB of the serving cell is 20 ms. As shown in FIG. 7, the configured time domain resource for the layer 3 measurement includes time domain resources to which a measurement gap 1, a measurement gap 2, and the measurement gap 3 belong.

Figure 8:
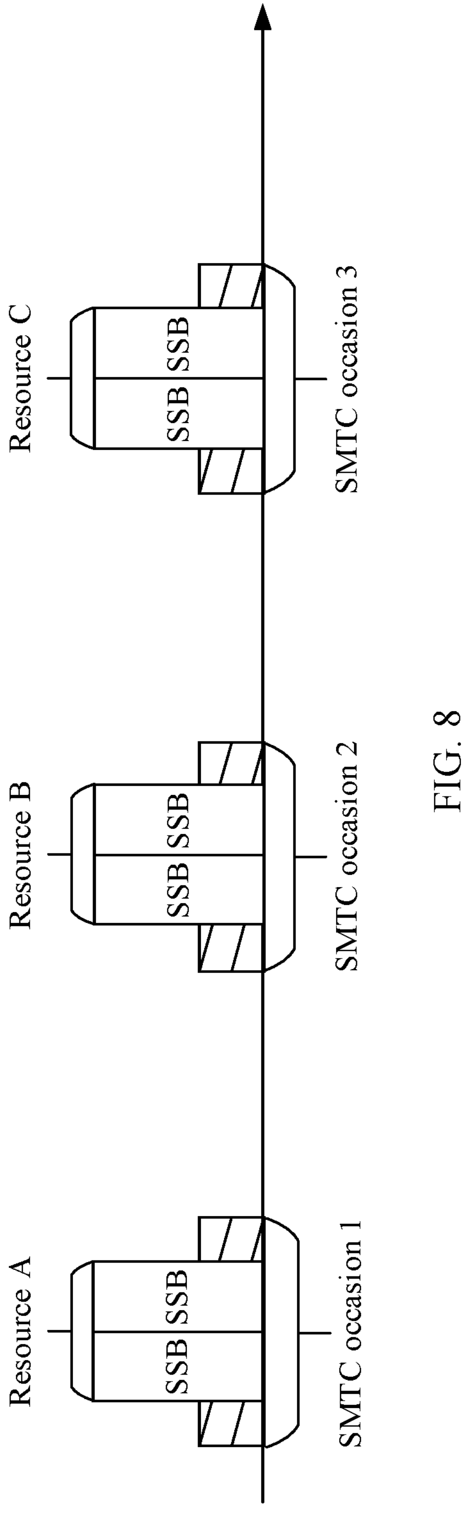
FIG. 8 is a schematic diagram showing that a time domain resource on which an SSB is located completely overlaps an SMTC occasion and a measurement gap according to this application.

Alternatively, it is assumed that a period of the SMTC occasion corresponding to a first MO is 40 ms, and a period of an SSB of the serving cell is 40 ms. As shown in FIG. 8, the configured time domain resource for the layer 3 measurement includes an SMTC occasion 1, an SMTC occasion 2, and an SMTC occasion 3.

For example, as shown in FIG. 7, the time domain resource on which the reference signal of the serving cell is located includes a resource 1, a resource 2, a resource 3, a resource 4, a resource 5, and a resource 6. The overlapping resource between the time domain resource on which the reference signal of the serving cell is located and the first time domain resource includes the time domain resources to which the measurement gap 1, the measurement gap 2, and the measurement gap 3 belong. As shown in FIG. 8, the time domain resource on which the reference signal of the serving cell is located includes a resource A, a resource B, and a resource C. The overlapping resource between the time domain resource on which the reference signal of the serving cell is located and the first time domain resource includes the SMTC occasion 1, the SMTC occasion 2, and the SMTC occasion 3.

Optionally, a frequency of the reference signal of the serving cell and the target frequency corresponding to the first MO may be in different frequency ranges. For example, one of the frequencies belongs to a frequency range 1 (frequency range 1, FR1), and the other belongs to an FR2. Alternatively, a frequency of the reference signal of the serving cell and the target frequency corresponding to the first MO may be in a same frequency range. For example, the frequencies both belong to a frequency range FR2. Further, when belonging to a same frequency range, the frequencies may be located in a same frequency band or different frequency bands. This is not limited in this application.

Optionally, the second time domain resource, that is, the time domain resource for the layer 3 measurement in the overlapping resource between the time domain resource on which the reference signal of the serving cell is located and the first time domain resource, may be determined according to the existing 3GPP TS 38.133 protocol.

For example, as shown in FIG. 7, the SSB partially overlaps the measurement gap, and partially overlaps the SMTC occasion, and the SMTC occasion completely overlaps the measurement gap. Therefore, according to the existing 3GPP TS 38.133 protocol, when $$P = \frac{1}{1 - \frac{T_{SSB}}{\min(T_{SMTCperiod}, MGRP)}} = \frac{1}{1 - \frac{20}{\min(40, 40)}} = 2,$$

it can be learned from the foregoing that, 1/P resources are for the layer 1 measurement, and (1−1/P) resources are for the layer 3 measurement. In this case, ½ resources in the time domain resource on which the reference signal of the serving cell is located are for the layer 1 measurement, the other ½ resources are for the layer 3 measurement. The ½ resources for the layer 3 measurement are all overlapping resources between the time domain resource on which the reference signal of the serving cell is located and the first time domain resource. In other words, in the example shown in FIG. 7, the second time domain resource includes the time domain resources to which the measurement gap 1, the measurement gap 2, and the measurement gap 3 belong.

For example, as shown in FIG. 8, the SSB completely overlaps the SMTC occasion. Therefore, according to the existing 3GPP TS 38.133 protocol, when P=3, ⅓ of the time domain resource on which the reference signal of the serving cell is located are for the layer 1 measurement, and the other ⅔ resources are for the layer 3 measurement. The ⅔ resources are a part of the overlapping resource between the time domain resource on which the reference signal of the serving cell is located and the first time domain resource. It is assumed that the ⅔ resources include the resource B and the resource C. In the example shown in FIG. 8, the second time domain resource includes the SMTC occasion 2 and the SMTC occasion 3.

Optionally, the first proportion is the proportion of the resource for the first measurement to the second time domain resource. For example, as shown in FIG. 7, the second time domain resource includes the time domain resources to which the measurement gap 1, the measurement gap 2, and the measurement gap 3 belong. In this case, the first proportion may be a proportion of the resource for the first measurement to a sum of the time domain resources in which the measurement gap 1, the measurement gap 2, and the measurement gap 3 belong. As shown in FIG. 8, the second time domain resource includes the SMTC occasion 2 and the SMTC occasion 3. In this case, the first proportion may be a proportion of the resource for the first measurement to a sum of the SMTC occasion 2 and the SMTC occasion 3.

Optionally, the resource for the first measurement may be a resource that can be for the first measurement, and the terminal device may perform the first measurement on a part or all of the resource that can be for the first measurement. As shown in FIG. 7, an example in which the first proportion is ⅔ is used. The resource for the first measurement may be two of the measurement gap 1, the measurement gap 2, and the measurement gap 3. For example, the resource for the first measurement may be the measurement gap 1 and the measurement gap 2. The terminal device may perform the first measurement in one or more of the measurement gap 1 and the measurement gap 2. Because a time domain resource on which the SSB of the serving cell is located includes the resource 1 and the resource 3, the resource 1 overlaps the measurement gap 1, and the resource 3 overlaps the measurement gap 2. Therefore, that the terminal device performs the first measurement in one or more of the measurement gap 1 and the measurement gap 2 may be understood as that the terminal device performs the first measurement on one or more of the resource 1 and the resource 3. If the terminal device performs the first measurement on the resource 1, a proportion of a resource used by the terminal device to perform the first measurement to the second time domain resource is ⅓.

Alternatively, the resource for the first measurement may be the resource used by the terminal device to perform the first measurement. As shown in FIG. 7, for example, the first proportion is ⅓. In this case, the resource for the first measurement may be one of the measurement gap 1, the measurement gap 2, and the measurement gap 3. For example, the resource for the first measurement may be the measurement gap 1. Correspondingly, the terminal device performs the first measurement on the resource 1.

It may be understood that the resource for the first measurement is a resource for the first measurement in the second time domain resource. That the resource for completing the first measurement includes only the resource for the first measurement in the second time domain resource is not limited in this application. For example, the resource for completing the first measurement may further include a resource that is for the layer 1 measurement and that is determined according to the existing 3GPP TS 38.133 protocol. For example, based on the example shown in FIG. 7, the resource for completing the first measurement may further include one or more of the resource 2, the resource 4, or the resource 6. Based on the example shown in FIG. 8, the resource for completing the first measurement may further include the resource A.

Optionally, that the first parameter is associated with a first proportion may include: The first parameter is determined based on the first proportion. For example, the first parameter and the first proportion may meet the following formula (1):

$$P' = \frac{1}{1/P + (1 - 1/P) * X} \tag{1}$$

P' is the first parameter, 1/P is a proportion of a time domain resource for the layer 1 measurement to the time domain resource on which the reference signal of the serving cell is located, and X is the first proportion. For example, X may be represented as a b, where b may represent a quantity of second time domain resources, and a may represent a quantity of time domain resources for the layer 1 measurement in the second time domain resources. In this case, the formula that the first parameter and the first proportion meet may be written as the following formula (2): Alternatively, X may be represented as a (a+c), where a+c=b, and c may represent a quantity of time domain resources in the second time domain resource other than the time domain resource for the layer 1 measurement. In this case, a formula that the first parameter and the first proportion meet may be written as the following formula (3): For example, based on the example shown in FIG. 7, the quantity b of second time domain resources is 3 (namely, the measurement gap 1, the measurement gap 2, and the measurement gap 3). If the first proportion is ⅔, a is equal to 2, indicating that two of the measurement gap 1, the measurement gap 2, and the measurement gap 3 are for the layer 1 measurement, and c is equal to 1.

$$P' = \frac{1}{1/P + (1 - 1/P) * a/b} \tag{2}$$

$$P' = \frac{1}{1/P + (1 - 1/P) * a/(a + c)} \tag{3}$$

Optionally, the proportion of the time domain resource for the layer 1 measurement to the time domain resource on which the reference signal of the serving cell is located may be determined according to the existing 3GPP TS 38.133 protocol.

For example, based on the example shown in FIG. 7, $$P = \frac{1}{1 - \frac{T_{SSB}}{\min(T_{SMTCperiod}, MGRP)}} = \frac{1}{1 - \frac{20}{\min(40, 40)}} = 2$$

may be obtained according to the existing 3GPP TS 38.133 protocol, to be specific, the proportion of the time domain resource for the layer 1 measurement to the time domain resource on which the reference signal of the serving cell is located is ½. For example, the time domain resource for the layer 1 measurement may include the resource 2, the resource 4, and the resource 6.

Based on the example shown in FIG. 8, P=3 may be obtained according to the existing 3GPP TS 38.133 protocol, to be specific, the proportion of the time domain resource for the layer 1 measurement to the time domain resource on which the reference signal of the serving cell is located is ⅓. For example, the time domain resource for the layer 1 measurement may include the resource A.

Figure 9:
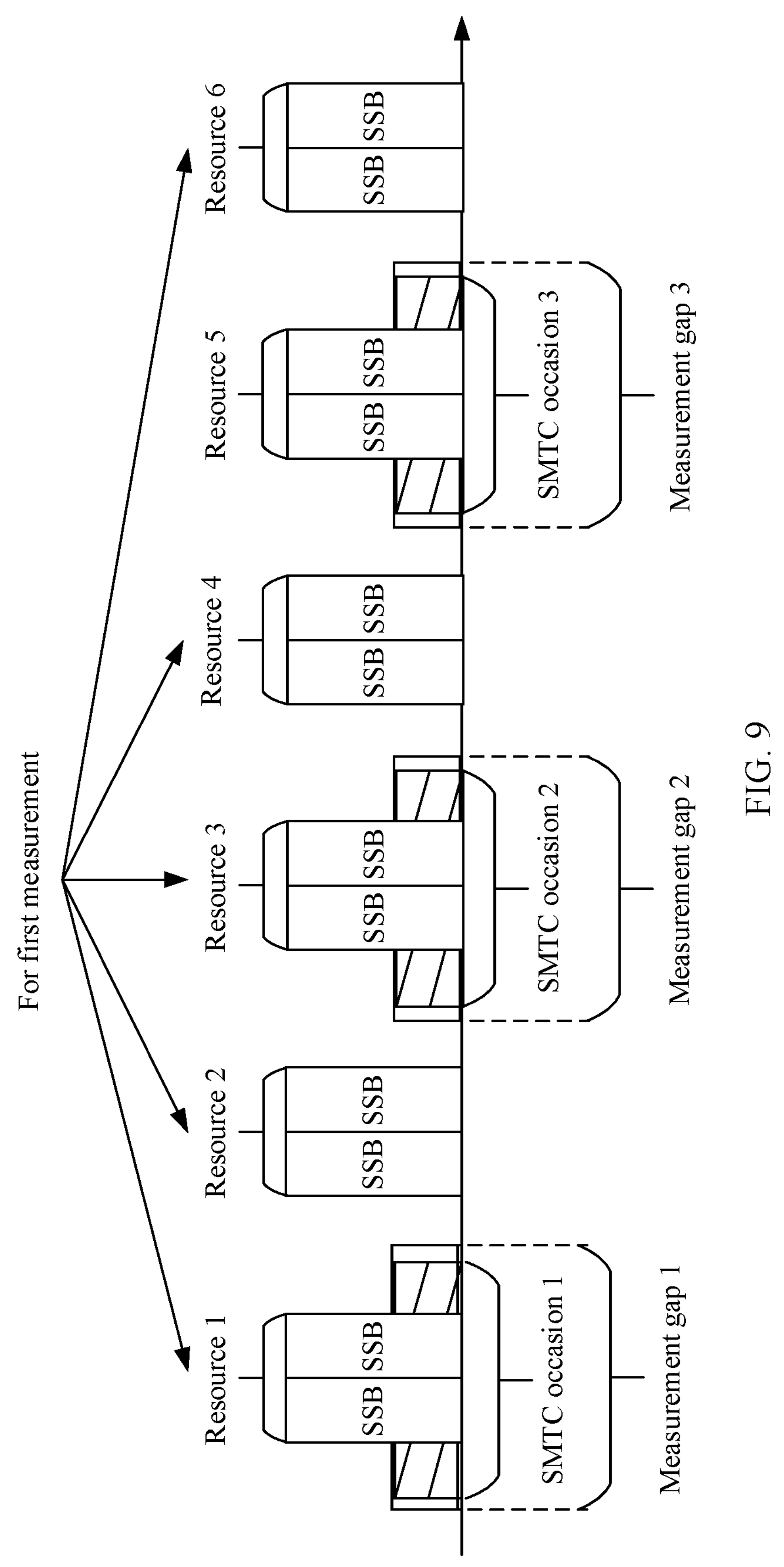
FIG. 9 is a schematic diagram of a resource for first measurement in an overlapping resource according to this application.

Optionally, a reciprocal of the first parameter may indicate a proportion of a time domain resource that can be for the first measurement to the time domain resource on which the reference signal of the serving cell is located. For example, based on the example shown in FIG. 7, it is assumed that the first proportion is ⅔. The first parameter $$P' = \frac{1}{1/P + (1 - 1/P) * a/b} = \frac{1}{1/2 + (1 - 1/2) * 2/3} = \frac{6}{5}$$

indicates that the proportion of the time domain resource that can be for the first measurement to the time domain resource on which the reference signal of the serving cell is located is ⅚. For example, as shown in FIG. 9, the time domain resource that can be for the first measurement may include a resource 1, a resource 2, a resource 3, a resource 4, and a resource 6.

Figure 10:
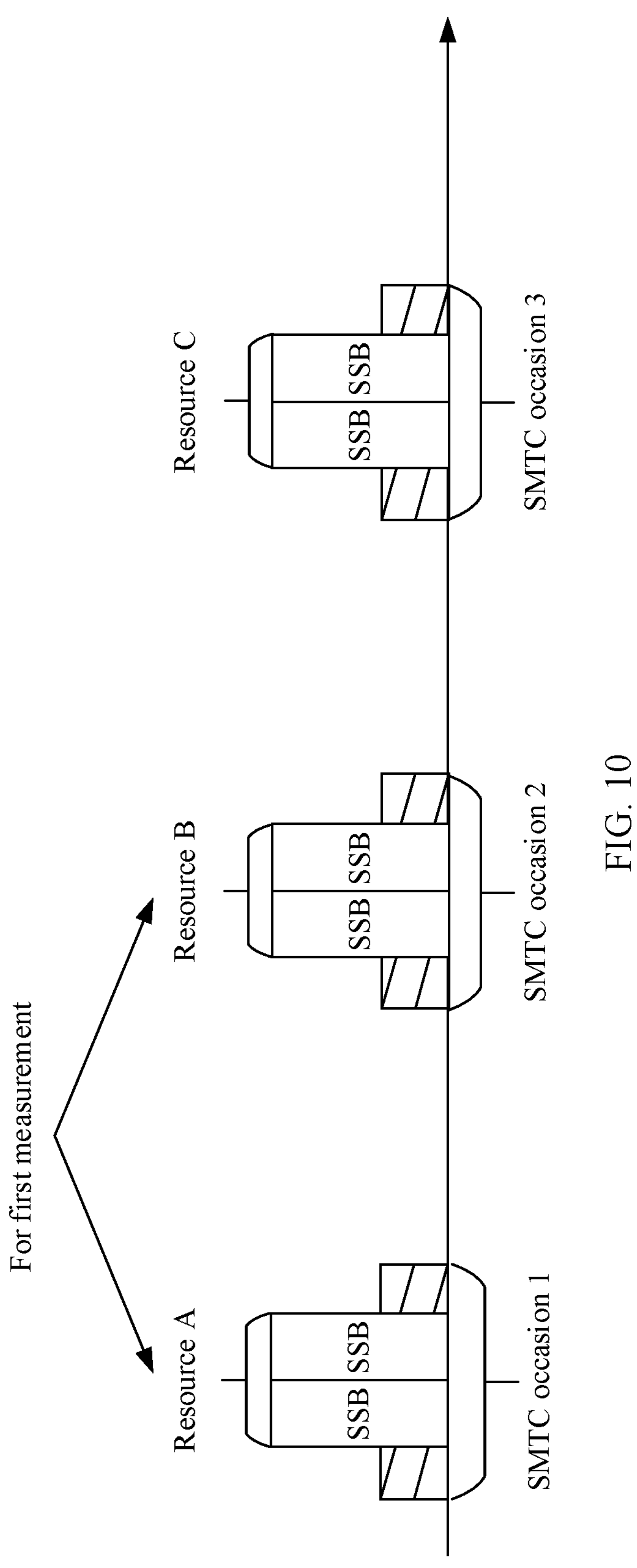
FIG. 10 is a schematic diagram of another resource for first measurement in an overlapping resource according to this application.

Based on the example shown in FIG. 8, it is assumed that the first proportion is ½. The first parameter $$P' = \frac{1}{1/P + (1-1/P)*a/b} = \frac{1}{1/3 + (1-1/3)*1/2} = \frac{3}{2}$$

indicates that the proportion of the time domain resource that can be for the first measurement to the time domain resource on which the reference signal of the serving cell is located is ⅔. For example, as shown in FIG. 10, the time domain resource that can be for the first measurement may include a resource A and a resource B.

S602. The terminal device determines first duration based on the first parameter. That is, the first duration is determined by the first parameter.

Optionally, that the terminal device determines first duration based on the first parameter may include: The terminal device determines the first duration based on the first parameter and at least one of the following: an L1 measurement result reporting period $T_{report}$, the period $T_{RS}$ of the reference signal of the serving cell, a beam sweeping coefficient N, a quantity M of sampling points, or a DRX cycle $T_{DRX}$.

In different cases, the foregoing parameters and the first duration may meet different formulas. For ease of description, the following provides descriptions with reference to a case 1 to a case 6. Correspondingly, for a correspondence between the foregoing parameters and the first duration, refer to Table 2 to Table 7.

Case 1: Optionally, depending on whether DRX is configured for the terminal device, when the first measurement is L1-RSRP measurement or L1-SINR measurement in the FR1, the foregoing parameters and the first duration $T_{L1}$ may meet the following formulas shown in Table 2:

TABLE 2

| Configuration | First duration $T_{L1}$ (ms) |
|---|---|
| DRX not configured | max ($T_{report}$, ceil (M * P') * $T_{RS}$) |
| DRX cycle ≤ Second threshold | max ($T_{report}$, ceil (K * M * P') * max ($T_{DRX}$, $T_{RS}$)) |
| DRX cycle > Second threshold | ceil (M * P') *$T_{DRX}$ |

$T_{report}$ is the L1 measurement result reporting period, and when the measurement result does not need to be reported, a value of $T_{report}$ may be 0. ceil (x) indicates a minimum integer greater than or equal to x. P' is the first parameter. $T_{RS}$ is the period of the reference signal of the serving cell. When the reference signal of the serving cell is an SSB, $T_{RS}$ may be $T_{SSB}$. When the reference signal of the serving cell is a CSI-RS, $T_{RS}$ may be $T_{CSI-RS}$. M is the quantity of sampling points. K is a constant. When $T_{RS}$≤40 ms and highSpeedMeasFlag-r16 is configured, a value of K may be 1; otherwise, a value of K may be 1.5. max(x, y) represents a larger value of x and y, and * indicates a mathematical multiplication sign.

Optionally, a value of M may be predefined in a protocol or preconfigured, or a value of M may be determined by whether a channel measurement time restriction parameter is configured. For example, if the channel measurement time restriction parameter is configured, the value of M may be 1; or if the channel measurement time restriction parameter is not configured, the value of M may be 3.

Optionally, for the FR1, the quantity M of sampling points may represent a maximum quantity of effective measurement times that need to be performed to obtain an effective measurement result. Optionally, for the FR2, the quantity M of sampling points may represent a maximum quantity of effective measurement times that need to be performed to obtain an effective measurement result in a beam direction.

Case 2: When the first measurement is L1-RSRP measurement or L1-SINR measurement in the FR2, the foregoing parameters and the first duration Ty may meet the following formulas shown in Table 3:

TABLE 3

| Configuration | First duration $T_{L1}$ (ms) |
|---|---|
| DRX not configured | max ($T_{report}$, ceil (M * P' * N) * $T_{RS}$) |
| DRX cycle ≤ Second threshold | max ($T_{report}$, ceil (A * M * P' * N) * max ($T_{DRX}$, $T_{RS}$)) |
| DRX cycle > Second threshold | ceil (B * M * P' * N)*$T_{DRX}$ |

N is the beam sweeping coefficient, and A and B are constants. For example, values of A and B may be 1.5, or certainly may be other values, and values of A and B may be the same or different. This is not limited. For other parameters, refer to related descriptions in Table 2. Details are not described herein again.

Optionally, a value of N may be predefined in a protocol or preconfigured, or may be configured by the radio access network device. This is not limited in this application. N is a positive integer greater than or equal to 1.

Optionally, the beam sweeping coefficient N may represent a maximum value of a quantity of beam sweeping directions. For example, when performing the L1 measurement, the terminal device may perform beam sweeping in N1 directions, where N1 is less than or equal to N.

Optionally, M multiplied by N may represent a maximum quantity of effective measurement times that need to be performed to obtain an effective measurement result based on a plurality of beam directions, and M is a positive integer greater than or equal to 1.

Optionally, the second threshold may be specified in a protocol, or may be configured by the radio access network device. This is not limited. For example, the second threshold may be 320 ms.

It should be noted that the method provided in this application further relates to a first threshold. Details are described in a subsequent embodiment, and are not described herein.

Case 3: When the first measurement is RLM in-sync measurement in the FR1, the foregoing parameters and the first duration $T_{L1}$ may meet the following formulas shown in Table 4:

TABLE 4

| Configuration | First duration $T_{L1}$ (ms) |
|---|---|
| DRX not configured | max (100, ceil ($M_{in}$ * P') * $T_{RS}$) |
| DRX cycle ≤ Second threshold | max (100, ceil (1.5* $M_{in}$ * P') * max ($T_{DRX}$, $T_{RS}$)) |
| DRX cycle > Second threshold | ceil($M_{in}$ * P') *$T_{DRX}$ |

$M_{in}$ is the quantity of sampling points. For example, $M_{in}$=10. $T_{RS}$ may be 5 ms, 10 ms, 20 ms, or 40 ms. For other parameters, refer to related descriptions in Table 2 or Table 3. Details are not described herein again.

Case 4: When the first measurement is RLM in-sync measurement in the FR2, the foregoing parameters and the first duration $T_{L1}$ may meet the following formulas shown in Table 5:

TABLE 5

| Configuration | First duration $T_{L1}$ (ms) |
|---|---|
| DRX not configured | max (100, ceil ($M_{in}$ * P' * N) *$T_{RS}$) |
| DRX cycle ≤ Second threshold | max (100, ceil (1.5* $M_{in}$ * P' * N) * max ($T_{DRX}$, $T_{RS}$)) |
| DRX cycle > Second threshold | ceil ($M_{in}$ * P' * N) * $T_{DRX}$ |

N is the beam sweeping coefficient. For other parameters, refer to related descriptions in Table 2, Table 3, or Table 4. Details are not described herein again.

Case 5: When the first measurement is CBD measurement in the FR1, the foregoing parameters and the first duration $T_{L1}$ may meet the following formulas shown in Table 6:

TABLE 6

| Configuration | First duration $T_{L1}$ (ms) |
|---|---|
| DRX not configured, and DRX cycle ≤ second threshold | max (25, ceil (M * P' * $P_{CBD}$) *$T_{RS}$) |
| DRX cycle > Second threshold | ceil (M * P' * $P_{CBD}$)*$T_{DRX}$ |

M is the quantity of sampling points. For example, M=3. $P_{CBD}$ is a candidate beam detection period. For other parameters, refer to related descriptions in Table 2. Details are not described herein again.

Case 6: When the first measurement is CBD measurement in the FR2, the foregoing parameters and the first duration $T_{L1}$ may meet the following formulas shown in Table 7:

TABLE 7

| Configuration | First duration $T_{L1}$ (ms) |
|---|---|
| DRX not configured, and DRX cycle ≤ second threshold | max (25, ceil (M * N * P' * $P_{CBD}$) * $T_{RS}$) |
| DRX cycle > Second threshold | ceil (M * N * P' * $P_{CBD}$)*$T_{DRX}$ |

N is the beam sweeping coefficient. For other parameters, refer to related descriptions in Table 2 or Table 6. Details are not described herein again.

S603. The terminal device performs the first measurement on the reference signal of the serving cell within the first duration, to obtain at least one measurement result.

Optionally, the first duration may be understood as duration of one layer 1 measurement period. When DRX is not configured for the terminal device, in a process in which the terminal device performs the first measurement on the reference signal of the serving cell within the first duration to obtain the measurement result, the terminal device may measure the reference signal of the serving cell within one or more $T_{RS}$. Refer to the foregoing related descriptions of the L1 measurement period, and details are not described herein again.

When DRX is not configured for the terminal device, in an implementation, the terminal device may perform the first measurement based on a larger value of the DRX cycle and the period of the reference signal of the serving cell. To be specific, in a process of performing the first measurement within the first duration to obtain the measurement result, the terminal device may measure the reference signal of the serving cell within one or more $T_{max}$. $T_{max}$ is the larger value of the DRX cycle and the period of the reference signal of the serving cell. In this case, the first duration is calculated based on the formulas used when DRX is configured in Table 2 to Table 7.

When DRX is configured for the terminal device, in another implementation, the terminal device may perform, based on the period of the reference signal of the serving cell, the first measurement on the reference signal of the serving cell within the first duration. In other words, the first measurement is performed based on a fact that the DRX is not configured for the terminal device. In this case, the first duration is calculated based on the formulas used when DRX is not configured in Table 2 to Table 7. In other words, when DRX is configured for the terminal device, the first duration is the same as the first duration when the terminal device is not configured with DRX.

Based on this solution, when DRX is configured for the terminal device, the first measurement is performed based on the fact that DRX is not configured for the terminal device, so that the first duration can be shortened, and an L1 measurement delay can be reduced. For example, the first measurement is L1-RSRP measurement in the FR2, the reference signal of the serving cell is an SSB, the period of the SSB is 20 ms, the periods of the SMTC occasion and the measurement gap are 40 ms, an overlapping status is shown in FIG. 7, the DRX cycle is 160 ms, M is equal to 1, N is equal to 8, B is equal to 1.5, and the measurement result does not need to be reported. When DRX is configured for the terminal device, if the layer 3 measurement is preferentially performed according to an existing standard, and the first measurement is performed based on the larger value of the DRX cycle and the period of the reference signal of the serving cell, the first duration is 1.5*1*2*8*160=3840 ms. If the first measurement is performed according to the method in this application and based on the larger value of the DRX cycle and the period of the reference signal of the serving cell, when the first parameter is equal to 1, the first duration is 1.5*1*2*8*160=1920 ms. If the first measurement is performed according to the method in this application and based on the fact that DRX is configured, when the first parameter is equal to 1, the first duration is 1*1*8*20=160 ms.

Optionally, when the layer 3 measurement is preferentially performed according to an existing standard, if DRX is configured for the terminal device, the first measurement may also be performed based on the fact that DRX is not configured. Based on the foregoing example, in this scenario, the first duration is 1*2*8*20=320 ms, and the first duration may also be shortened to reduce a delay.

Based on this solution, some time domain resources originally for the layer 3 measurement in the overlapping resource may be for the layer 1 measurement based on the first proportion, to increase the resource that can be for the layer 1 measurement. The some time domain resources originally for the layer 3 measurement may be for the layer 1 measurement, so that the terminal device can perform the layer 1 measurement on these time domain resources, thereby meeting a requirement of the terminal device for preferentially performing the layer 1 measurement. In addition, because the resource that can be for the layer 1 measurement increases, duration for performing the layer 1 measurement to obtain the at least one measurement result can be shortened, that is, the first duration determined based on the first parameter associated with the first proportion is shortened, thereby reducing an L1 measurement delay. It may be understood that the time domain resources originally for the layer 3 measurement are the foregoing time domain resource for the layer 3 measurement specified in the existing 3GPP TS 38.133 protocol.

For example, based on the example shown in FIG. 7, $T_{report}$ is equal to 0, the first measurement is L1-RSRP measurement in the FR2, M is equal to 1, N is equal to 8, and DRX is not configured. $T_{L1\text{-}RSRP\_Measurement\_Period\_SSB}$=ceil (1*2*8)*20=320 ms may be obtained through calculation according to an existing standard (for example, Table 1). According to the measurement method provided in this application, assuming that the first parameter is 1, $T_{L1}$=ceil (1*1*8)*20=160 ms may be obtained through calculation according to Table 3. Alternatively, assuming that the first proportion is ⅔, and the first parameter is 6/5, $T_{L1}$=ceil(1*6/5*8)*20-200 ms may be obtained through calculation according to Table 3. Therefore, compared with the existing standard, duration for obtaining an L1 measurement result can be reduced in this application.

The foregoing describes an overall procedure of the measurement method provided in this application. The following further describes specific implementation of the measurement method in detail.

For step S601, the terminal device may obtain the first parameter in a plurality of possible scenarios. The following provides descriptions with reference to a manner A1 and a manner A2.

Manner A1: The terminal device may obtain the first parameter when a first target condition is met. The first target condition may include at least one of the following:

(1) The terminal device receives first signaling from the radio access network device, where the first signaling is for activating a target secondary cell, and the target secondary cell is unknown to the terminal device.

Optionally, in a scenario in which a secondary cell is activated, the serving cell may be the target secondary cell, and the first measurement may be measurement on a reference signal of the target secondary cell, for example, measurement on an SSB or a CSI-RS of the target secondary cell. In addition, the first measurement may be L1-RSRP measurement or L1-SINR measurement. For the target secondary cell being unknown to the terminal device, refer to the foregoing related descriptions that the SCell is unknown to the terminal device. Details are not described herein again.

(2) The terminal device receives second signaling from the radio access network device, where the second signaling indicates to switch to a target TCI state, and the target TCI state is unknown to the terminal device.

Optionally, switching to the target TCI state may include switching to a target receive beam indicated by the target TCI state. For the target TCI state being unknown to the terminal device, refer to the foregoing related descriptions that the TCI state is unknown to the terminal device. Details are not described herein again.

Optionally, in a TCI state switching scenario, when the target TCI state includes an SSB of the serving cell, the reference signal of the serving cell may be the SSB included in the TCI state, and the first measurement may be measurement on the SSB. When the target TCI state includes a CSI-RS of the serving cell, the reference signal of the serving cell may be an SSB that meets a QCL relationship with the CSI-RS, and the first measurement may be measurement on the SSB that meets the QCL relationship with the CSI-RS.

(3) The terminal device receives third signaling from the radio access network device, where the third signaling indicates to switch to a target uplink spatial relation, and the target uplink spatial relation is unknown to the terminal device.

Optionally, switching to the target uplink spatial relation may include switching to a target transmit beam indicated by the target uplink spatial relation. For the target uplink spatial relation being unknown to the terminal device, refer to the foregoing related descriptions that the uplink spatial relation is unknown to the terminal device. Details are not described herein again.

Optionally, in an uplink spatial relation switching scenario, when the target uplink spatial relation includes an SSB of the serving cell, the reference signal of the serving cell may be the SSB included in the target uplink spatial relation, and the first measurement may be measurement on the SSB. When the target uplink spatial relation includes a CSI-RS of the serving cell, the reference signal of the serving cell may be an SSB that meets a QCL relationship with the CSI-RS, and the first measurement may be measurement on the SSB that meets the QCL relationship with the CSI-RS.

(4) A beam failure occurs in the serving cell. For the beam failure, refer to the foregoing related descriptions. Details are not described herein again.

Optionally, when the beam failure occurs in the serving cell, the reference signal of the serving cell may be a reference signal corresponding to a resource in a candidate beam resource group, and the first measurement may be measurement on the reference signal corresponding to the resource in the candidate beam resource group. For example, the reference signal corresponding to the resource in the candidate beam resource group may be an SSB or a CSI-RS.

(5) The radio link monitoring out-of-synchronization (RLM out-of-sync) is triggered. For the RLM out-of-sync, refer to the foregoing related descriptions. Details are not described herein again.

Optionally, when the RLM out-of-sync is triggered, the reference signal of the serving cell may be a reference signal of the serving cell specified by the radio access network device, the first measurement may be measurement on the reference signal specified by the radio access network device, and a beam corresponding to the specified reference signal may be a beam used by the radio access network device to point to the terminal device. For example, the specified reference signal may be an SSB or a CSI-RS.

(6) The radio access network device configures a second parameter for the terminal device, where the second parameter indicates restricted channel measurement time. For example, the second parameter may be a channel measurement time restriction (time RestrictionForChannelMeasurement).

For example, when the condition (6) is met, the first measurement may be L1-RSRP measurement or L1-SINR measurement. The reference signal of the serving cell may be an SSB or a CSI-RS.

As described above, when the first target condition is met, when the terminal device needs to complete the layer 1 measurement as soon as possible, the terminal device may obtain the first parameter based on the first target condition, and perform the measurement method shown in FIG. 6, to perform the layer 1 measurement as soon as possible, so that a process corresponding to the first target condition can be quickly completed. In some possible implementations, in the foregoing manner, the target secondary cell can be quickly activated, or switching to the target receive beam indicated by the target TCI state can be quickly implemented quickly. This reduces a delay of a related process, thereby improving communication efficiency.

It should be noted that, based on this solution, when duration in each of the related processes (1) to (6) is calculated, if the duration of the related process includes duration of the L1 measurement, the duration of the L1 measurement may be calculated in a manner in a corresponding scenario shown in Table 2 to Table 7. For example, when activation time $T_{activation\_time}$ of the target secondary cell is calculated, duration $T_{L1\_RSRP\_measure}$ of the L1 measurement meets the formula shown in Table 3.

Manner A2: When the first MO is associated with a conditional reconfiguration (conditional reconfiguration) event, the terminal device may obtain the first parameter when a second target condition is met.

Optionally, the conditional reconfiguration event may be an event executed under a specific condition, and the specific condition is a trigger condition. That is, when the trigger condition is met, the conditional reconfiguration event is executed. For example, the conditional reconfiguration event may be conditional handover (conditional handover, CHO), conditional primary secondary cell change (conditional PSCell change, CPC), or the like. This is not limited in this application.

Optionally, the trigger condition of the conditional reconfiguration event is configured (or associated) by using a measurement identifier (measurement ID, MeasID). That the first MO is associated with a conditional reconfiguration event may be understood as: The first MO is associated with a MeasID, and the MeasID is configured as (or associated with) a trigger condition of a conditional reconfiguration event. For example, an association relationship between the first MO and the conditional reconfiguration event may be: The trigger condition of the conditional reconfiguration event is that a measurement result of the neighboring cell on the target frequency corresponding to the first MO is greater than a threshold.

Optionally, the second target condition may include at least one of the following:

(a) Measurement on the first MO is performed in a measurement gap corresponding to the first MO, measurement gaps in different frequency ranges are independent of each other, and a frequency of the reference signal of the serving cell and a target frequency corresponding to the first MO belong to different frequency ranges.

Optionally, that measurement gaps in different frequency ranges are independent of each other may be understood that different frequency ranges have respective independent measurement gap configurations. For example, a measurement gap configuration corresponding to the FR1 is a configuration 1, and a measurement gap configuration corresponding to the FR2 is a configuration 2. For example, a frequency band of the reference signal of the serving cell belongs to the FR1, and the target frequency corresponding to the first MO belongs to the FR2. Because the measurement gaps in different frequency ranges are independent of each other, when the first measurement is in preference to L3 measurement corresponding to a measurement gap of the FR1 in the FR1, measurement on the target frequency corresponding to the first MO in the measurement gap in the FR2 is not affected.

(b) Measurement on the first MO is gapless measurement, the frequency of the reference signal of the serving cell and the target frequency corresponding to the first MO are in different frequency bands, a carrier-specific scaling factor (carrier-specific scaling factor, CSSF) of the first MO is irrelevant to a second MO or a first CC. Frequency channel numbers of the second MO and the first CC and the frequency of the reference signal of the serving cell are located in a same frequency band.

Optionally, the CSSF of the first MO may be related to measurement duration of a plurality of MOs configured by the radio access network device. When the CSSF of the first MO is irrelevant to the second MO or the first CC, even if measurement duration of the second MO or the first CC is affected when the first measurement is preferentially performed, because the CSSF of the first MO is irrelevant to the second MO or the first CC, the CSSF of the first MO is not affected. In other words, measurement on the target frequency corresponding to the first MO is not affected when the first measurement is preferentially performed.

Optionally, if the L1 measurement is preferentially performed when the time domain resource on which the reference signal of the serving cell is located partially or completely overlaps the time domain resource to which the measurement gap belongs, and the L1 measurement is not preferentially performed when the time domain resource on which the reference signal of the serving cell is located partially or completely overlaps the SMTC occasion (or CMTC occasion), the second target condition may be the condition (a) or the condition (b).

The L1 measurement is preferentially performed, that is, the method provided in this application is performed, so that some time domain resources originally for the layer 3 measurement in the overlapping resource may be for the layer 1 measurement based on the first proportion, to increase the resource that can be for the layer 1 measurement.

Optionally, if the L3 measurement is preferentially performed when the time domain resource on which the reference signal of the serving cell is located partially or completely overlaps the time domain resource to which the measurement gap belongs, and the L1 measurement is preferentially performed when the time domain resource on which the reference signal of the serving cell is located partially or completely overlaps the SMTC occasion (or CMTC occasion), the second target condition may be the condition (a) or the condition (b).

Optionally, if the L1 measurement is not preferentially performed when the time domain resource on which the reference signal of the serving cell is located partially or completely overlaps the time domain resource to which the measurement gap belongs, and the L1 measurement is preferentially performed when the time domain resource on which the reference signal of the serving cell is located partially or completely overlaps the SMTC occasion (or CMTC occasion), the second target condition may be the condition (b).

Based on this solution, when the conditional reconfiguration event is considered, the L1 measurement is preferentially performed without affecting measurement on the MO associated with the conditional reconfiguration event, so that the L1 measurement delay can be reduced and impact on performance of the conditional reconfiguration event can be reduced.

It should be noted that when the first MO is associated with the conditional reconfiguration event, the terminal device may perform the solution in this application, that is, perform the solution of steps S601 to S603. In other words, for a terminal device for which the conditional reconfiguration event is configured, if the second target condition is met, the terminal device may perform steps S601 to S603.

In addition, in a possible implementation, if the radio access network device configures the conditional reconfiguration event for the terminal device, the terminal device performs a related operation according to a specification in an existing protocol, that is, skips performing determining on the second target condition, thereby skipping performing the solution in this application. It may be understood that in this implementation, if no conditional reconfiguration event is configured for the terminal device, the terminal device may perform the solution in this application, that is, perform steps S601 to S603. In this case, the second target condition does not exist, and step S601 is not related to determining of the second target condition.

Optionally, the first target condition and the second target condition may be used separately, or may be used in combination. For example, the terminal device may obtain the first parameter when one of the first target condition and the second target condition is met, or obtain the first parameter when both the first target condition and the second target condition are met.

This is not limited in this application.

For step S601, the terminal device may obtain the first parameter in a plurality of manners. The following provides descriptions with reference to a manner B1 and a manner B2.

Manner B1: That the terminal device obtains the first parameter may include: The terminal device reads the first parameter that is stored, pre-stored, firmed, or pre-burned in the terminal device.

Optionally, in this possible implementation, the value of the first parameter may be specified in a protocol. Correspondingly, the first parameter may be stored, pre-stored, firmed, or pre-burned in the terminal device.

Optionally, the protocol may specify a unique value of the first parameter. In other words, as specified in the protocol, the first parameter has only one value. For example, as specified in the protocol, the first parameter is 1. Correspondingly, when the first parameter is 1, the first proportion is also 1. In other words, that the first parameter is associated with the first proportion may include: The first parameter is equal to the first proportion, and both are 1. In this case, all overlapping resources between the time domain resource on which the reference signal of the serving cell is located and the first time domain resource are for the first measurement, or the overlapping resource is not for the L3 measurement.

Further, when all resources in the overlapping resource are for the first measurement, all time domain resources on which the reference signal of the serving cell is located within the first duration may be for the first measurement. In other words, the time domain resource on which the reference signal of the serving cell is located within the first duration is not for the L3 measurement.

Optionally, the protocol may specify a group of candidate values of the first parameter. In other words, as specified in the protocol, the first parameter may have a plurality of candidate values. In actual application, the radio access network device may indicate, to the terminal device, that the first parameter is a value in a plurality of candidate values. For example, the radio access network device may send index information to the terminal device, where an index indicated by the index information is an index of the value of the first parameter in a candidate value group.

Manner B2: That the terminal device obtains the first parameter may include: The terminal device determines the first parameter based on the first proportion. For example, the first proportion and the first parameter meet the foregoing formula (1) or formula (2). Refer to the foregoing related descriptions. Details are not described herein again.

Optionally, the terminal device may obtain the first proportion in a plurality of implementations. The following provides descriptions with reference to a manner C1 to a manner C3.

Manner C1: A value of the first proportion may be specified in a protocol. Correspondingly, the first proportion may be stored, pre-stored, firmed, or pre-burned in the terminal device.

Optionally, the protocol may specify a unique value of the first proportion or specify a group of candidate values, and the radio access network device indicates a specific value that is used. Refer to related descriptions of the first parameter. Details are not described herein again.

Manner C2: The value of the first proportion is determined based on an allocation ratio.

The allocation ratio is a ratio of the resource for the first measurement to the resource for the layer 3 measurement in the second time domain resource. For example, if the first proportion is a/b, the allocation ratio may be represented as a:(b−a).

For example, based on the example shown in FIG. 7, the second time domain resource includes the measurement gap 1, the measurement gap 2, and the measurement gap 3. If the allocation ratio is 2:1, it indicates that two of the measurement gap 1, the measurement gap 2, and the measurement gap 3 are for the first measurement, and the other measurement gap is for the layer 3 measurement.

Optionally, the allocation ratio may be specified in a protocol. The protocol may specify a unique value of the allocation ratio or specify a group of candidate values, and the radio access network device indicates a specific value that is used. Refer to related descriptions of the first parameter. Details are not described herein again.

Manner C3: The first proportion is configured by the radio access network device for the terminal device.

Figure 11:
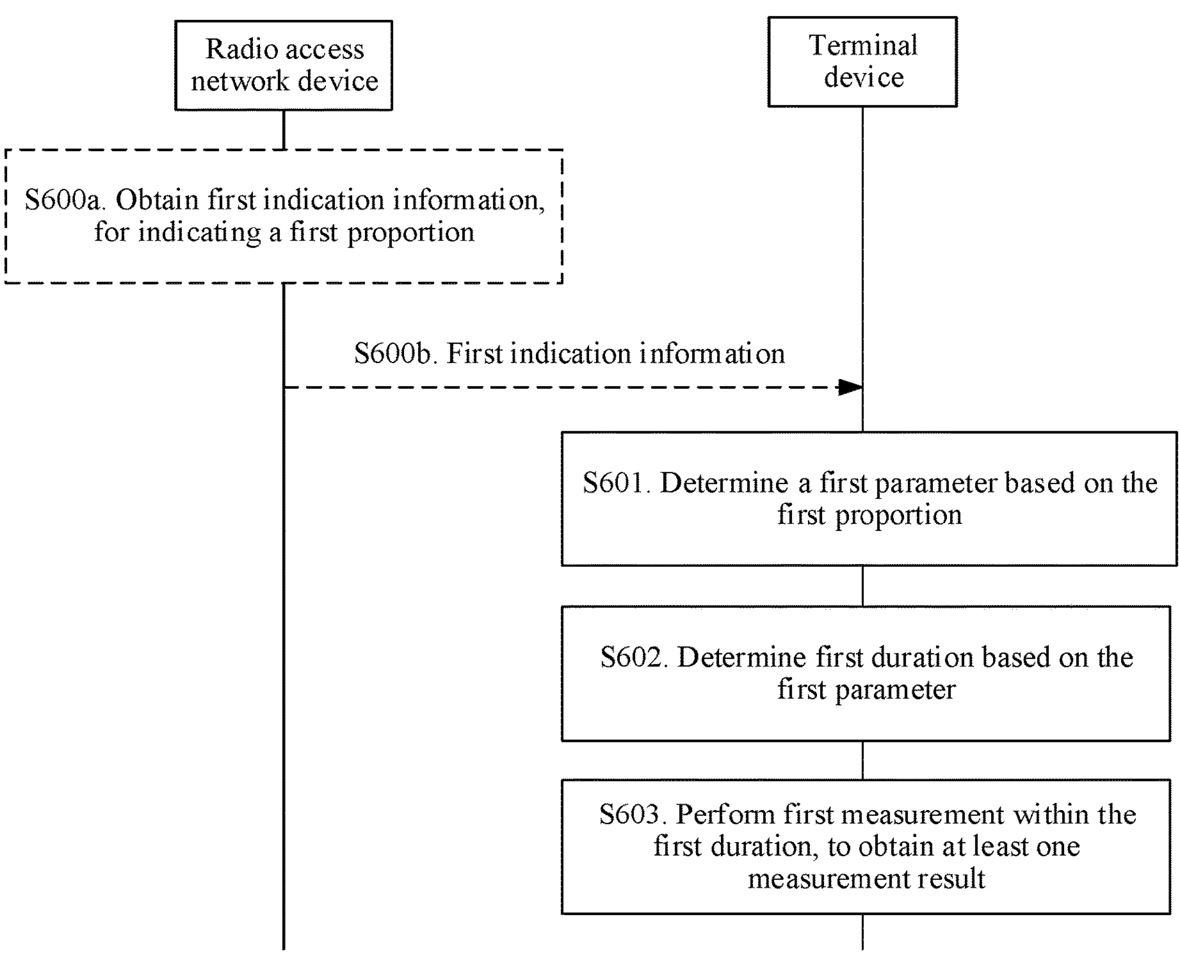
FIG. 11 is a schematic flowchart of another measurement method according to this application.

In this scenario, as shown in FIG. 11, before the terminal device obtains the first parameter, the measurement method provided in this application further includes the following steps.

S600*a*. The radio access network device obtains first indication information. The first indication information indicates the first proportion.

Optionally, the radio access network device may obtain the first indication information when a fourth target condition is met. The fourth target condition may include at least one of the following: sending first signaling to the terminal device, sending second signaling to the terminal device, sending third signaling to the terminal device, configuring a second parameter for the terminal device, or sending second indication information to the terminal device. For the first signaling, the second signaling, the third signaling, and the second parameter, refer to related descriptions of the first target condition in step S601. Details are not described herein again. The second indication information is described in a subsequent embodiment. Details are not described herein.

S600*b*. The radio access network device sends the first indication information to the terminal device. Correspondingly, the terminal device receives the first indication information from the radio access network device.

Optionally, the first indication information may explicitly indicate the first proportion. For example, the first indication information includes the first proportion. Alternatively, the first indication information may implicitly indicate the first proportion. For example, the first indication information includes the allocation ratio. Alternatively, the radio access network device may preconfigure a group of allocation ratios for the terminal device, for example, [0, 1:4, 1:2, 3:4, 1], and subsequently dynamically indicate, by using signaling, a ratio to be used. For example, the first indication information includes an allocation ratio index. It may be understood that, when the first indication information includes the allocation ratio or the allocation ratio index, the terminal device may determine the first proportion based on the allocation ratio or the allocation ratio index. For the allocation ratio and a relationship between the allocation ratio and the first proportion, refer to related descriptions in the foregoing manner C2. Details are not described herein again.

Optionally, the first indication information may be carried in an RRC message, carried in downlink control information (downlink control information, DCI), or carried in a MAC CE.

Optionally, after receiving the first indication information, the terminal device may determine the first proportion based on the first indication information, to determine the first parameter based on the first proportion. In other words, in this scenario, step S601 may be: The terminal device determines the first parameter based on the first proportion.

In this way, when the time domain resource on which the reference signal of the serving cell is located overlaps the time domain resource that is configured by the radio access network device and that is for the layer 3 measurement, the L1 measurement can be preferentially performed, thereby reducing a delay in obtaining the L1 measurement result.

In some implementation scenarios, before step S601, the terminal device may first determine whether a function of preferentially performing the L1 measurement is enabled. If the function is enabled, the method shown in FIG. 6 or FIG. 11 is performed. If the function is not enabled, the L3 measurement is preferentially performed according to an existing standard. For example, when the first parameter is associated with the first proportion, the terminal device may determine that the function of preferentially performing the L1 measurement is enabled.

In a possible implementation, the terminal device may determine, based on an indication of the radio access network device, that the first parameter is associated with the first proportion.

Optionally, the radio access network device may obtain the second indication information, and send the second indication information to the terminal device. The second indication information indicates that the first parameter is associated with the first proportion. Correspondingly, the terminal device receives the second indication information. After receiving the second indication information, the terminal device may determine that the first parameter is associated with the first proportion, to determine that the function of preferentially performing the L1 measurement is enabled, so that the method shown in FIG. 6 or FIG. 11 is performed.

Optionally, because the L3 measurement is mainly for cell handover, if the radio access network device determines that current mobility of the terminal device is low, an emergency degree or a priority of the L3 measurement is also low. Therefore, the radio access network device may obtain the second indication information, and control, by sending the second indication information to the terminal device, the terminal device to preferentially perform the L1 measurement.

Optionally, the radio access network device may further obtain third indication information, and send the third indication information to the terminal device. The third indication information may indicate that the L3 measurement is preferentially performed. Correspondingly, the terminal device receives the third indication information. After receiving the third indication information, the terminal device may determine that the function of preferentially performing the L1 measurement is disabled, to preferentially perform the L3 measurement according to an existing standard.

Optionally, the radio access network device may send the third indication information to the terminal device when determining that the emergency degree or the priority of the L3 measurement is higher than an emergency degree of the L1 measurement. For example, the radio access network device may send the third indication information to the terminal device when determining that current mobility of the terminal device is high. Optionally, the emergency degrees or the priorities of the L1 measurement and the L3 measurement may be determined by the radio access network device based on the current mobility of the terminal device. For example, when the current mobility of the terminal device is high, cell handover may need to be frequently performed to ensure communication continuity. In addition, the cell handover depends on the L3 measurement. Therefore, the emergency degree or the priority of the L3 measurement is high. When the current mobility of the terminal device is low, cell handover may not be required. In this case, the emergency degree or the priority of the L3 measurement is low, and the L1 measurement may be preferentially performed, to improve communication efficiency. It should be noted that the emergency degrees or the priorities of the L1 measurement and the L3 measurement may alternatively be determined by the radio access network device in another manner. This is not limited in this application.

Optionally, the second indication information or the third indication information may be carried in an RRC message, DCI, or a MAC CE.

Optionally, in this possible implementation, when the first target condition is met, if the terminal device receives the second indication information from the radio access network device, the terminal device performs the method shown in FIG. 6 or FIG. 11; or if the terminal device receives the third indication information from the radio access network device, the terminal device preferentially performs the L3 measurement according to the existing standard.

Based on this solution, the radio access network device may control, based on an actual situation, the terminal device to preferentially perform the L1 measurement or preferentially perform the L3 measurement, thereby improving measurement flexibility.

In another possible implementation, when the third target condition is met, the first parameter is associated with the first proportion, so that the terminal device can determine that the function of preferentially performing the L1 measurement is enabled, and perform the method shown in FIG. 6 or FIG. 11. The third target condition includes: Duration in which signal quality of a PCell and/or a PSCell meet/meets the first threshold is greater than a second duration.

Optionally, the terminal device may continuously monitor the signal quality of the PCell and/or the PSCell. For example, if the signal quality of the PCell and/or the PSCell meet/meets the first threshold within the second duration before a current moment, the first parameter is associated with the first proportion. Therefore, the terminal device determines that the function of preferentially performing the L1 measurement is enabled.

Optionally, the signal quality may include at least one of the following: RSRP, RSRQ, or an SINR. That the signal quality meets the first threshold may be understood as: The signal quality is greater than or equal to the first threshold. The second duration may be 0.

Optionally, when the signal quality includes a plurality of items in the RSRP, the RSRQ, and the SINR, the first threshold may correspondingly include a plurality of sub-thresholds, and each sub-threshold corresponds to one signal quality parameter. For example, if the signal quality includes the RSRP and the RSRQ, the first threshold includes RSRP corresponding to the first sub-threshold, and includes RSRQ corresponding to the second sub-threshold.

Optionally, when the signal quality includes a plurality of items in the RSRP, the RSRQ, and the SINR, and the first threshold includes a plurality of sub-thresholds, that the signal quality of the PCell meets the first threshold may include: Each signal quality parameter of the PCell meets a corresponding sub-threshold. For example, the signal quality includes the RSRP and the RSRQ, the first threshold includes the RSRP corresponding to the first sub-threshold, and includes the RSRQ corresponding to the second sub-threshold. That the signal quality of the PCell meets the first threshold may include: The RSRP of the PCell meets the first sub-threshold, and the RSRQ of the PCell meets the second sub-threshold.

Alternatively, that the signal quality of the PCell meets the first threshold may include: Some signal quality parameters of the PCell meet corresponding sub-thresholds. For example, that the signal quality includes the RSRP and the RSRQ, and the first threshold includes the RSRP corresponding to the first sub-threshold and the RSRQ corresponding to the second sub-threshold. That the signal quality of the PCell meets the first threshold may include: The RSRP of the PCell meets the first sub-threshold, or the RSRQ of the PCell meets the second sub-threshold.

When the signal quality includes a plurality of items in the RSRP, the RSRQ, and the SINR, and the first threshold includes a plurality of sub-thresholds, for descriptions that the signal quality of the PSCell meets the first threshold, refer to related descriptions of the PCell. Details are not described herein again.

Optionally, when duration in which the signal quality of the PCell and/or the PSCell is less than or equal to a third threshold is greater than third duration, the terminal device preferentially performs the L3 measurement. Therefore, the terminal device can determine that the function of preferentially performing the L1 measurement is disabled, and preferentially perform the L3 measurement according to an existing standard. For the third threshold, refer to related descriptions of the first threshold. For the third duration, refer to related descriptions of the second duration. Details are not described herein again.

Optionally, in this possible implementation, when the first target condition is met, the terminal device performs the method shown in FIG. 6 or FIG. 11 if the duration in which the signal quality of the PCell and/or the PSCell meets the first threshold is greater than the second duration; or if the duration in which the signal quality of the PCell and/or the PSCell is less than or equal to the third threshold is greater than the third duration, the terminal device preferentially performs the L3 measurement according to an existing standard.

Optionally, the first threshold, the second duration, the third threshold, or the third duration may be specified in a protocol, may be configured by the radio access network device, or may be determined by the terminal device. This is not specifically limited in this application.

Based on this solution, based on signal quality of the PCell and/or the PSCell, the terminal device may preferentially perform the L1 measurement when the signal quality is good to improve communication efficiency or a network throughput, and preferentially perform the L3 measurement when the signal quality is poor to perform cell handover to ensure service continuity, thereby improving measurement flexibility.

The foregoing mainly describes the solutions provided in this application. Correspondingly, this application further provides a communication apparatus, and the communication apparatus is configured to implement the foregoing methods. The communication apparatus may be the terminal device in the foregoing method embodiments, or may be a component that can be used in the terminal device, for example, a processor, a chip, a chip system, a circuit, a logic module, or software. Alternatively, the communication apparatus may be the radio access network device in the foregoing method embodiments, or may be a component that can be used in the radio access network device, for example, a processor, a chip, a chip system, a circuit, a logic module, or software.

It may be understood that, to implement the foregoing functions, the communication apparatus includes a hardware structure and/or a software module for performing a corresponding function. A person skilled in the art should easily be aware that, in combination with units and algorithm steps of the examples described in embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the communication apparatus may be divided into functional modules based on the foregoing method embodiments. For example, each functional module may be obtained through division based on each corresponding function, or two or more functions may be integrated into one processing module. The integrated module may be implemented in a form of hardware, or may be implemented in a form of a software functional module. It should be noted that, in embodiments of this application, module division is an example, and is merely a logical function division. During actual implementation, another division manner may be used.

Figure 12:
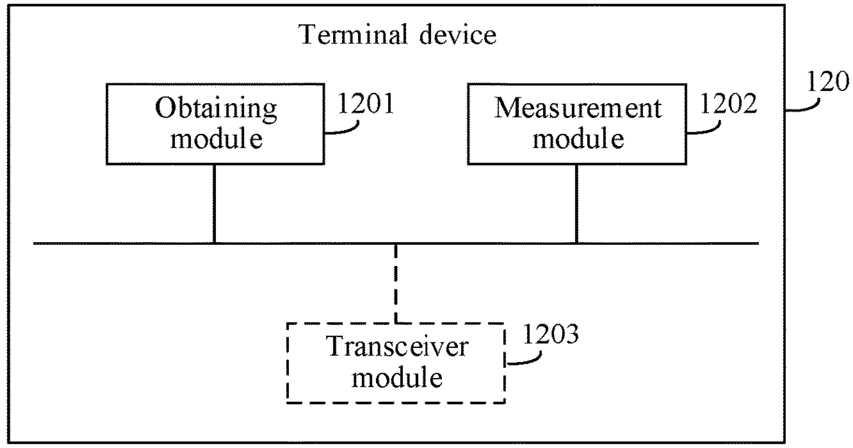
FIG. 12 is a schematic diagram of a structure of a terminal device according to this application.

Optionally, an example in which the communication apparatus is the terminal device in the foregoing method embodiments is used. FIG. 12 is a schematic diagram of a structure of a terminal device 120. The terminal device 120 includes an obtaining module 1201 and a measurement module 1202. Optionally, the apparatus may further include a transceiver module 1203.

In some embodiments, the terminal device 120 may further include a storage module (not shown in FIG. 12), configured to store program instructions and data.

In some embodiments, the transceiver module 1203 may also be referred to as a transceiver unit, and is configured to implement a sending function and/or a receiving function. The transceiver module 1203 may include a transceiver circuit, a transceiver machine, a transceiver, or a communication interface.

In some embodiments, the transceiver module 1203 may include a receiving module and a sending module, respectively configured to perform receiving and sending steps performed by the terminal device in the foregoing method embodiments, and/or configured to support another process of the technology described in this specification. The obtaining module 1201 may be configured to perform an obtaining (for example, determining and obtaining) step performed by the terminal device in the foregoing method embodiments, and/or configured to support another process of the technology described in this specification. The measurement module 1202 may be configured to perform a measurement-related step performed by the terminal device in the foregoing method embodiments, and/or configured to support another process of the technology described in this specification.

In Some Implementation Scenarios:

The obtaining module 1201 is configured to obtain a first parameter. The obtaining module 1201 is further configured to determine first duration based on the first parameter. The measurement module 1202 is configured to perform first measurement on a reference signal of a serving cell within the first duration, to obtain at least one measurement result, where the first measurement is layer 1 measurement, the first parameter is associated with a first proportion, the first proportion is a proportion of a resource for the first measurement to a second time domain resource, the second time domain resource is a time domain resource for layer 3 measurement in an overlapping resource between a time domain resource on which the reference signal of the serving cell is located and a first time domain resource, and the first time domain resource is a configured time domain resource for the layer 3 measurement.

Optionally, that the obtaining module 1201 is configured to obtain a first parameter includes: The obtaining module 1201 is configured to obtain the first parameter when a first target condition is met, where the first target condition includes at least one of the following:

first signaling is received from a radio access network device, where the first signaling is for activating a target secondary cell, and the target secondary cell is unknown to the terminal device;

second signaling is received from the radio access network device, where the second signaling indicates to switch to a target transmission configuration indicator TCI state, and the target TCI state is unknown to the terminal device;

third signaling is received from the radio access network device, where the third signaling indicates to switch to a target uplink spatial relation, and the target uplink spatial relation is unknown to the terminal device;

a beam failure occurs in the serving cell;

radio link monitoring out-of-synchronization is triggered; or a second parameter is configured, where the second parameter indicates restricted channel measurement time.

Optionally, the transceiver module 1203 is configured to receive first indication information from the radio access network device, where the first indication information indicates the first proportion.

Optionally, the transceiver module 1203 is configured to receive second indication information from the radio access network device, where the second indication information indicates that the first parameter is associated with the first proportion.

Optionally, when a first MO is associated with a trigger condition of a conditional reconfiguration event, that the obtaining module 1201 is configured to obtain a first parameter includes: The obtaining module 1201 is configured to obtain the first parameter when a second target condition is met, where the second target condition includes at least one of the following:

measurement on the first MO is performed in a measurement gap corresponding to the first MO, measurement gaps in different frequency ranges are independent of each other, and a frequency of the reference signal of the serving cell and a target frequency corresponding to the first MO belong to different frequency ranges; or measurement on the first MO is gapless measurement, a frequency of the reference signal of the serving cell and a target frequency corresponding to the first MO are in different frequency bands, a carrier-specific scaling factor CSSF of the first MO is irrelevant to a second MO or a first component carrier CC, and frequencies of the second MO and the first CC are in a same frequency band as the frequency of the reference signal of the serving cell.

Optionally, when discontinuous reception DRX is configured for the terminal device, that the measurement module 1202 is configured to perform first measurement on a reference signal of a serving cell within the first duration includes: The measurement module 1202 is configured to perform, based on a period of the reference signal of the serving cell, the first measurement on the reference signal of the serving cell within the first duration.

Optionally, that the obtaining module 1201 is further configured to determine first duration based on the first parameter includes: The obtaining module 1201 is configured to determine the first duration based on the first parameter and at least one of the following: a configured measurement result reporting period, the period of the reference signal of the serving cell, a beam sweeping coefficient, a quantity of sampling points, or a DRX cycle.

In some other implementation scenarios:

The obtaining module 1201 is configured to: when a first target condition is met, determine that a first parameter is equal to 1. The obtaining module 1201 is further configured to determine first duration based on the first parameter. The measurement module 1202 is configured to perform first measurement on a reference signal of a serving cell within the first duration, to obtain at least one measurement result, where the first measurement is layer 1 measurement. When the first parameter is equal to 1, an overlapping resource between a time domain resource on which the reference signal of the serving cell is located and a first time domain resource is for the first measurement, and the first time domain resource is a configured time domain resource for layer 3 measurement.

All related content of the steps in the foregoing method embodiments may be cited in function descriptions of the corresponding functional modules. Details are not described herein again.

In some embodiments, when the terminal device 120 in FIG. 12 is a chip or a chip system, a function/implementation process of the transceiver module 1203 may be implemented by an input/output interface (or a communication interface) of the chip or the chip system, and functions/implementation processes of the obtaining module 1201 and the measurement module 1202 may be implemented by a processor (or a processing circuit) of the chip or the chip system.

Because the terminal device 120 provided in this embodiment may perform the foregoing methods, for a technical effect that can be obtained by the terminal device, refer to the foregoing method embodiments. Details are not described herein again.

Figure 13:
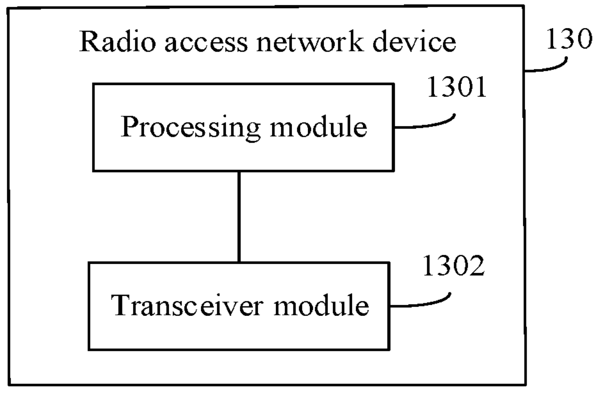
FIG. 13 is a schematic diagram of a structure of a radio access network device according to this application.

Optionally, an example in which the communication apparatus is the radio access network device in the foregoing method embodiments is used. FIG. 13 is a schematic diagram of a structure of a radio access network device 130. The radio access network device 130 includes a processing module 1301 and a transceiver module 1302.

In some embodiments, the radio access network device 130 may further include a storage module (not shown in FIG. 13), configured to store program instructions and data.

In some embodiments, the transceiver module 1302 may also be referred to as a transceiver unit, and is configured to implement a sending function and/or a receiving function. The transceiver module 1302 may include a transceiver circuit, a transceiver machine, a transceiver, or a communication interface.

In some embodiments, the transceiver module 1302 may include a receiving module and a sending module, respectively configured to perform receiving and sending steps performed by the radio access network device in the foregoing method embodiments, and/or configured to support another process of the technology described in this specification. The processing module 1301 may be configured to perform a processing (for example, determining and obtaining) step performed by the radio access network device in the foregoing method embodiments, and/or configured to support another process of the technology described in this specification.

For example, the processing module 1301 is configured to obtain second indication information. The transceiver module 1302 is configured to send the second indication information to a terminal device, where the second indication information indicates that a first parameter is associated with a first proportion, the first parameter is for determining first duration, and the first duration is for first measurement. The first proportion is a proportion of a resource for the first measurement to a second time domain resource, the second time domain resource is a time domain resource for layer 3 measurement in an overlapping resource between a time domain resource on which the reference signal of the serving cell is located and a first time domain resource, the first time domain resource is a configured time domain resource for the layer 3 measurement, and the first measurement is layer 1 measurement.

Optionally, the transceiver module 1302 is further configured to send first indication information to the terminal device, where the first indication information indicates the first proportion.

All related content of the steps in the foregoing method embodiments may be cited in function descriptions of the corresponding functional modules. Details are not described herein again.

In some embodiments, when the radio access network device 130 in FIG. 13 is a chip or a chip system, a function/implementation process of the transceiver module 1302 may be implemented by an input/output interface (or a communication interface) of the chip or the chip system, and a function/implementation process of the processing module 1301 may be implemented by a processor (or a processing circuit) of the chip or the chip system.

Because the radio access network device 130 provided in this embodiment may perform the foregoing methods, for a technical effect that can be obtained by the terminal device, refer to the foregoing method embodiments. Details are not described herein again.

In a possible product form, the terminal device or the radio access network device in embodiments of this application may be further implemented by using one or more field programmable gate arrays (field programmable gate arrays, FPGAs), a programmable logic device (programmable logic device, PLD), a controller, a state machine, a gate logic, a discrete hardware component, any other suitable circuit, or any combination of circuits that can perform various functions described in this application.

Figure 14:
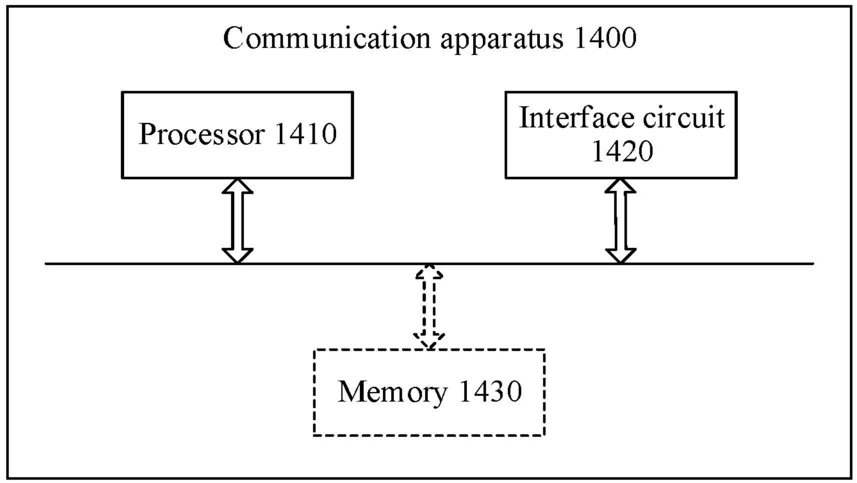
FIG. 14 is a schematic diagram of a structure of a communication apparatus according to this application.

In another possible product form, the terminal device or the radio access network device in embodiments of this application may be implemented by a general bus architecture. For ease of description, refer to FIG. 14. FIG. 14 is a schematic diagram of a structure of a communication apparatus 1400 according to this application. The communication apparatus 1400 may be configured to implement a function of the terminal device or a function of the radio access network device in the foregoing method embodiments.

As shown in FIG. 14, the communication apparatus 1400 includes a processor 1410 and an interface circuit 1420. The processor 1410 and the interface circuit 1420 are coupled to each other. It can be understood that the interface circuit 1420 may be a transceiver or an input/output interface. Optionally, the communication apparatus 1400 may further include a memory 1430, configured to: store instructions to be executed by the processor 1410, store input data required for running instructions by the processor 1410, or store data generated after the processor 1410 runs instructions.

When the communication apparatus 1400 is configured to implement functions of the terminal device, the processor 1410 is configured to implement functions of the obtaining module 1201 and the measurement module 1202, and the interface circuit 1420 is configured to implement a function of the transceiver module 1203.

When the communication apparatus 1400 is configured to implement functions of the radio access network device, the processor 1410 is configured to implement functions of the processing module 1301, and the interface circuit 1420 is configured to implement a function of the transceiver module 1302.

When the communication apparatus is a chip used in a terminal device, the chip of the terminal device implements functions of the terminal device in the foregoing method embodiments. The terminal chip receives information from another module (for example, a radio frequency module or an antenna) in the terminal device, where the information is sent by a radio access network device to the terminal device; or the terminal chip outputs information to another module (for example, a radio frequency module or an antenna) in the terminal device, where the information is sent by the terminal device to another terminal or the radio access network device.

When the communication apparatus is a module used in a radio access network device, the module in the radio access network device implements functions of the radio access network device in the foregoing method embodiments. The module receives information from another module (for example, a radio frequency module or an antenna) in the radio access network device, where the information is sent by a terminal device to the radio access network device; or the module sends information to another module (for example, a radio frequency module or an antenna) in the radio access network device, where the information is sent by the radio access network device to the terminal device. The module herein may be a baseband chip in the base station, or may be a DU or another module. The DU herein may be a DU in an open radio access network (open radio access network, O-RAN) architecture.

In some embodiments, an embodiment of this application further provides a communication apparatus. The communication apparatus includes a processor, configured to implement the method in any one of the foregoing method embodiments.

In a possible implementation, the communication apparatus further includes a memory. The memory is configured to store a necessary computer program and data. The computer program may include instructions. The processor may invoke the instructions in the computer program stored in the memory, to instruct the communication apparatus to perform the method in any foregoing method embodiment. Certainly, the communication apparatus may not include a memory.

In another possible implementation, the communication apparatus further includes an interface circuit. The interface circuit is a code/data read/write interface circuit, and the interface circuit is configured to receive computer-executable instructions (where the computer-executable instructions are stored in a memory, and may be directly read from the memory, or may be read via another component) and send the computer-executable instructions to the processor.

In still another possible implementation, the communication apparatus further includes a communication interface, and the communication interface is configured to communicate with a module other than the communication apparatus.

It may be understood that the communication apparatus may be a chip or a chip system. When the communication apparatus is a chip system, the communication apparatus may include a chip, or may include a chip and another discrete component. This is not specifically limited in embodiments of this application.

It can be understood that the processor in embodiments of this application may be a central processing unit (Central Processing Unit, CPU), or may be another general-purpose processor, a digital signal processor (Digital Signal Processor, DSP), an application-specific integrated circuit (Application-Specific Integrated Circuit, ASIC), a field programmable gate array (Field Programmable Gate Array, FPGA) or another programmable logic device, a transistor logic device, a hardware component, or any combination thereof. The general-purpose processor may be a microprocessor or any regular processor or the like.

The memory in embodiments of this application may be an apparatus having a storage function. For example, the memory may be a read-only memory (read-only memory, ROM), another type of static storage device that can store static information and instructions, a random access memory (random access memory, RAM), or another type of dynamic storage device that can store information and instructions, or may be an electrically erasable programmable read-only memory (electrically erasable programmable read-only memory, EEPROM), a compact disc read-only memory (compact disc read-only memory, CD-ROM) or other compact disc storage, optical disc storage (including a compact disc, a laser disc, an optical disc, a digital versatile disc, a Blu-ray disc, and the like), a magnetic disk storage medium or another magnetic storage device, or any other medium that can be configured to carry or store expected program code in a form of an instruction structure or a data structure and that can be accessed by a computer, but is not limited thereto. The memory may exist independently, and is connected to the processor through the communication line 402. The memory may alternatively be integrated with the processor.

This application further provides a computer-readable storage medium. The computer-readable storage medium stores computer programs or instructions. When the computer programs or instructions are executed by a computer, functions in any foregoing method embodiment are implemented.

This application further provides a computer program product. When the computer program product is executed by a computer, functions of any one of the foregoing method embodiments are implemented.

A person of ordinary skill in the art may understand that, for the purpose of convenient and brief description, for a detailed working process of the foregoing system, apparatuses, and units, refer to a corresponding process in the foregoing method embodiment. Details are not described herein again.

It may be understood that the system, apparatuses, and methods described in this application may alternatively be implemented in another manner. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may be physically separated or not, this is, may be located together in the same place or distributed on a plurality of network units. Parts displayed as units may be or may be not physical units. Some or all of the units may be selected based on actual requirements to achieve the objectives of the solutions of embodiments.

In addition, functional units in embodiments of this application may be integrated into one processing unit, or each of the units may exist alone physically, or two or more units may be integrated into one unit.

All or some of the foregoing embodiments may be implemented by using software, hardware, firmware, or any combination thereof. When a software program is used to implement embodiments, embodiments may be implemented completely or partially in a form of a computer program product. The computer program product includes one or more computer instructions. When the computer program instructions are loaded and executed on the computer, the procedure or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid-state drive, SSD)), or the like. In embodiments of this application, the computer may include the foregoing apparatuses.

Although this application is described with reference to embodiments, in a process of implementing this application that claims protection, a person skilled in the art may understand and implement another variation of the disclosed embodiments by viewing the accompanying drawings, disclosed content, and appended claims. In the claims, "comprising" (comprising) does not exclude another component or another step, and "a" or "one" does not exclude a case of multiple. A single processor or another unit may implement several functions enumerated in the claims. Some measures are recorded in dependent claims that are different from each other, but this does not mean that these measures cannot be combined to produce a better effect.

Although this application is described with reference to specific features and embodiments thereof, it is clear that various modifications and combinations may be made to them without departing from the scope of this application. Correspondingly, the specification and accompanying drawings are merely example description of this application defined by the accompanying claims, and are considered as any of or all modifications, variations, combinations or equivalents that cover the scope of this application. It is clearly that a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A measurement method for wireless communications, the method comprising:

obtaining a first parameter;

determining that the first parameter is associated with a first proportion when a third target condition is met, wherein the first proportion is a proportion of a first time resource for a layer 1 measurement to a second time domain resource for a layer 3 measurement, wherein the second time domain resource is at least part of an overlapping resource between a time domain resource on which a reference signal of a serving cell is located and a configured time domain resource for one or more layer 3 measurements, wherein the third target condition comprises that a duration in which signal quality of a primary cell (PCell) and/or a primary secondary cell (PSCell) meets a first threshold is greater than a second duration, and the signal quality comprises at least one of the following: reference signal received power (RSRP), reference signal received quality (RSRQ), or a signal to interference plus noise ratio (SINR);

determining first duration based on the first parameter; and performing the layer 1 measurement on the reference signal of the serving cell within the first duration, to obtain at least one measurement result.

2. The method of claim 1, the obtaining the first parameter comprising: obtaining the first parameter when a first target condition is met, wherein the first target condition comprises at least one of the following:

first signaling is received from a radio access network device, wherein the first signaling is for activating a target secondary cell, and the target secondary cell is unknown to the terminal device;

second signaling is received from the radio access network device, wherein the second signaling indicates to switch to a target transmission configuration indicator (TCI) status, and the target TCI state is unknown to the terminal device;

third signaling is received from the radio access network device, wherein the third signaling indicates to switch to a target uplink spatial relation, and the target uplink spatial relation is unknown to the terminal device;

a beam failure occurs in the serving cell;

radio link monitoring out-of-synchronization is triggered; or a second parameter is configured, wherein the second parameter indicates restricted channel measurement time.

3. The method of claim 1, the method further comprising: receiving, from the radio access network device, first indication information indicating the first proportion.

4. The method of claim 1, wherein the first parameter is obtained based on the following formula:

$$P' = \frac{1}{1/P + (1 - 1/P) * X},$$

wherein

P' is the first parameter, 1/P is a proportion of a time domain resource for the layer 1 measurement to the time domain resource on which the reference signal of the serving cell is located, and X is the first proportion.

5. The method of claim 1, wherein the first parameter is equal to the first proportion, and both are 1.

6. The method of claim 1, the method further comprising: receiving second indication information from the radio access network device, wherein the second indication information indicates that the first parameter is associated with the first proportion.

7. The method of claim 1, wherein the configured time domain resource for the one or more layer 3 measurements comprises: a synchronization signal/physical broadcast channel (SSB)-based measurement timing configuration (SMTC) occasion corresponding to a first measurement object (MO), and/or a time domain resource to which a measurement gap corresponding to the first MO belongs; or the configured time domain resource for the layer 3 measurement comprises: a channel state information-reference signal (CSI-RS)-based measurement timing configuration occasion corresponding to a first MO, and/or a time domain resource to which a measurement gap corresponding to the first MO belongs.

8. The method of claim 7, wherein the SMTC occasion is a duration of a measurement window configured by an SMTC corresponding to the first MO, and an SSB corresponding to the first MO is transmitted in the measurement window configured by the SMTC; and the CSI-RS-based measurement timing configuration occasion is a duration of a measurement window configured by a CSI-RS-based measurement timing configuration corresponding to the first MO, and a CSI-RS corresponding to the first MO is transmitted in the measurement window configured by the CSI-RS-based measurement timing configuration.

9. The method of claim 7, wherein when the first MO is associated with a conditional reconfiguration event, the obtaining, by the terminal device, the first parameter comprises: obtaining, by the terminal device, the first parameter when a second target condition is met, wherein the second target condition comprises: measurement on the first MO is performed in the measurement gap corresponding to the first MO, measurement gaps in different frequency ranges are independent of each other, and a frequency of the reference signal of the serving cell and a target frequency corresponding to the first MO belong to different frequency ranges; or measurement on the first MO is gapless measurement, a frequency of the reference signal of the serving cell and a target frequency corresponding to the first MO are in different frequency bands, a carrier-specific scaling factor (CSSF) of the first MO is irrelevant to a second MO or a first component carrier (CC), and frequencies of the second MO and the first CC are in a same frequency band as the frequency of the reference signal of the serving cell.

10. The method of claim 1, wherein when discontinuous reception (DRX) is configured, the performing the layer 1 measurement on the reference signal of the serving cell within the first duration comprises:

performing, based on a period of the reference signal of the serving cell, a first measurement on the reference signal of the serving cell within the first duration.

11. The method of claim 1, wherein the determining the first duration based on the first parameter comprises: determining the first duration based on the first parameter and at least one of the following: a layer 1 measurement result reporting period, the period of the reference signal of the serving cell, a beam sweeping coefficient, a quantity of sampling points, or a discontinuous reception (DRX) cycle.

12. An apparatus, comprising a processor; and a non-transitory memory storing instructions that, when executed by the processor, cause the apparatus to implement the method:

obtaining a first parameter;

determining that the first parameter is associated with a first proportion when a third target condition is met, wherein the first proportion is a proportion of a first time resource for a layer 1 measurement to a second time domain resource for a layer 3 measurement, wherein the second time domain resource is at least part of an overlapping resource between a time domain resource on which a reference signal of a serving cell is located and a configured time domain resource for one or more layer 3 measurements, wherein the third target condition comprises that a duration in which signal quality of a primary cell (PCell) and/or a primary secondary cell (PSCell) meets a first threshold is greater than a second duration, and the signal quality comprises at least one of the following: reference signal received power (RSRP) reference signal received quality (RSRQ), or a signal to interference plus noise ratio (SINR);

determining first duration based on the first parameter; and performing the layer 1 measurement on the reference signal of the serving cell within the first duration, to obtain at least one measurement result.

13. The apparatus of claim 12, wherein the obtaining the first parameter comprises: obtaining the first parameter when a first target condition is met, wherein the first target condition comprises at least one of the following:

first signaling is received from a radio access network device, wherein the first signaling is for activating a target secondary cell, and the target secondary cell is unknown to the terminal device;

second signaling is received from the radio access network device, wherein the second signaling indicates to switch to a target transmission configuration indicator (TCI) status, and the target TCI state is unknown to the terminal device;

third signaling is received from the radio access network device, wherein the third signaling indicates to switch to a target uplink spatial relation, and the target uplink spatial relation is unknown to the terminal device;

a beam failure occurs in the serving cell;

radio link monitoring out-of-synchronization is triggered; or a second parameter is configured, wherein the second parameter indicates restricted channel measurement time.

14. The apparatus of claim 12, wherein the configured time domain resource for the one or more layer 3 measurements comprises: a synchronization signal/physical broadcast channel (SSB)-based measurement timing configuration (SMTC) occasion corresponding to a first measurement object (MO), and/or a time domain resource to which a measurement gap corresponding to the first MO belongs; or the configured time domain resource for the layer 3 measurement comprises: a channel state information-reference signal (CSI-RS)-based measurement timing configuration occasion corresponding to a first MO, and/or a time domain resource to which a measurement gap corresponding to the first MO belongs.

15. The apparatus of claim 14, wherein the SMTC occasion is a duration of a measurement window configured by an SMTC corresponding to the first MO, and an SSB corresponding to the first MO is transmitted in the measurement window configured by the SMTC; and the CSI-RS-based measurement timing configuration occasion is a duration of a measurement window configured by a CSI-RS-based measurement timing configuration corresponding to the first MO, and a CSI-RS corresponding to the first MO is transmitted in the measurement window configured by the CSI-RS-based measurement timing configuration.

16. The apparatus of claim 12, wherein when discontinuous reception (DRX) is configured for the terminal device, the performing, by the terminal device, first measurement on a reference signal of a serving cell within the first duration comprises:

performing based on a period of the reference signal of the serving cell, a first measurement on the reference signal of the serving cell within the first duration.

17. The apparatus of claim 12, wherein the determining the first duration based on the first parameter comprises: determining the first duration based on the first parameter and at least one of the following: a layer 1 measurement result reporting period, the period of the reference signal of the serving cell, a beam sweeping coefficient, a quantity of sampling points, or a discontinuous reception (DRX) cycle.

18. A non-transitory computer-readable storage medium storing computer instructions that, when executed by a processor of a communication apparatus, cause the communication apparatus to perform operations including:

obtaining a first parameter;

determining that the first parameter is associated with a first proportion when a third target condition is met, wherein the first proportion is a proportion of a first time resource for a layer 1 measurement to a second time domain resource for a layer 3 measurement, wherein the second time domain resource is at least part of an overlapping resource between a time domain resource on which a reference signal of a serving cell is located and a configured time domain resource for one or more layer 3 measurements, wherein the third target condition comprises that a duration in which signal quality of a primary cell (PCell) and/or a primary secondary cell (PSCell) meets a first threshold is greater than a second duration, and the signal quality comprises at least one of the following: reference signal received power (RSRP), reference signal received quality (RSRQ), or a signal to interference plus noise ratio (SINR);

determining first duration based on the first parameter; and performing the layer 1 measurement on the reference signal of the serving cell within the first duration, to obtain at least one measurement result.

19. The non-transitory computer-readable storage medium of claim 18, wherein the first parameter is obtained based on the following formula:

$$P' = \frac{1}{1/P + (1 - 1/P) * X},$$

wherein

P' is the first parameter, 1/P is a proportion of a time domain resource for the layer 1 measurement to the time domain resource on which the reference signal of the serving cell is located, and X is the first proportion.

* * * * *